US012417260B2

(12) United States Patent
Cummings et al.

(10) Patent No.: US 12,417,260 B2
(45) Date of Patent: Sep. 16, 2025

(54) MACHINE LEARNING MODEL SCALING SYSTEM WITH ENERGY EFFICIENT NETWORK DATA TRANSFER FOR POWER AWARE HARDWARE

(71) Applicant: Intel Corporation, Santa Clara, CA (US)

(72) Inventors: Daniel J. Cummings, Austin, TX (US); Juan Pablo Munoz, Folsom, CA (US); Souvik Kundu, Los Angeles, CA (US); Sharath Nittur Sridhar, San Diego, CA (US); Maciej Szankin, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 17/506,161

(22) Filed: Oct. 20, 2021

(65) Prior Publication Data
US 2022/0036123 A1 Feb. 3, 2022

(51) Int. Cl.
G06N 20/00 (2019.01)
G06F 18/20 (2023.01)
(Continued)

(52) U.S. Cl.
CPC .......... *G06F 18/285* (2023.01); *G06F 18/217* (2023.01); *G06N 20/00* (2019.01); *G06V 10/751* (2022.01)

(58) Field of Classification Search
CPC ..... G06N 20/00; G06V 10/751; G06F 18/217
See application file for complete search history.

(56) References Cited

U.S. PATENT DOCUMENTS 10,803,392 B1\* 10/2020 Khan .................. H04L 67/10
2016/0328644 A1\* 11/2016 Lin .......................... G06N 3/04
(Continued)

FOREIGN PATENT DOCUMENTS

WO      WO2021158313 A1      8/2021

OTHER PUBLICATIONS

Alex Krizhevsky et al., "Learning Multiple Layers of Features from Tiny Images", Master's Thesis, U. of Toronto, Citeseer, 60 pages (Apr. 8, 2009), https://www.cs.toronto.edu/~kriz/learning-features-2009-TR.pdf.

(Continued)

Primary Examiner — Barbara M Level
(74) Attorney, Agent, or Firm — HANLEY, FLIGHT & ZIMMERMAN, LLC

(57) ABSTRACT

The present disclosure is related to machine learning model swap (MLMS) framework for that selects and interchanges machine learning (ML) models in an energy and communication efficient way while adapting the ML models to real time changes in system constraints. The MLMS framework includes an ML model search strategy that can flexibly adapt ML models for a wide variety of compute system and/or environmental changes. Energy and communication efficiency is achieved by using a similarity-based ML model selection process, which selects a replacement ML model that has the most overlap in pre-trained parameters from a
(Continued)

currently deployed ML model to minimize memory write operation overhead. Other embodiments may be described and/or claimed.

27 Claims, 6 Drawing Sheets

(51) Int. Cl.
   *G06F 18/21* (2023.01)
   *G06V 10/75* (2022.01)

(56) References Cited

U.S. PATENT DOCUMENTS

| | | | |
|---|---|---|---|
| 2019/0286984 A1 | 9/2019 | Vasudevan et al. | |
| 2019/0347548 A1 | 11/2019 | Amizadeh et al. | |
| 2019/0354837 A1 | 11/2019 | Zhou et al. | |
| 2020/0311561 A1* | 10/2020 | Naaman | G06N 3/063 |
| 2021/0081763 A1 | 3/2021 | Abdelfattah et al. | |
| 2021/0110140 A1* | 4/2021 | Munoz | G06F 18/213 |
| 2021/0350233 A1* | 11/2021 | Saboori | G06N 3/088 |
| 2022/0027792 A1 | 1/2022 | Cummings et al. | |
| 2022/0035877 A1 | 2/2022 | Sridhar et al. | |
| 2022/0035878 A1 | 2/2022 | Sarah et al. | |
| 2022/0036194 A1 | 2/2022 | Sundaresan et al. | |
| 2022/0277231 A1* | 9/2022 | Ostergaard | G06N 20/20 |
| 2022/0414534 A1* | 12/2022 | Ananthanarayanan | G06N 20/00 |
| 2023/0325711 A1* | 10/2023 | Haraldson | G06N 3/084 706/12 |
| 2024/0046148 A1* | 2/2024 | Bega | G06N 20/00 |
| 2024/0289687 A1* | 8/2024 | Kumar | G06N 20/00 |
| 2024/0362472 A1* | 10/2024 | Fu | G06N 3/088 |

OTHER PUBLICATIONS

Souvik Kundu et al., "A Tunable Robust Pruning Framework Through Dynamic Network Rewiring of DNNS", arXiv:2011.03083v2 [cs.CV], 8 pages (Nov. 24, 2020).
Namhoon Lee et al., "SNIP: Single-Shot Network Pruning based on Connection Sensitivity", Int'l Conference on Learning Representations (ICLR) 2019, 15 pages (May 6, 2019).
Tsung-Yi Lin et al., "Feature Pyramid Networks for Object Detection", Proceedings of the IEEE Conference on Computer Vision and Pattern Recognition 2017, pp. 2117-2125 (2017).
Zhuang Liu et al., "Rethinking the Value of Network Pruning", arXiv: 1810.05270v2 [cs.LG], 21 pages (Mar. 5, 2019).
Marc E. McDill, "Forest Resource Management", Penn State Univ., ch. 11, pp. 203-233 (Jun. 22, 1999), https://faculty.washington.edu/toths/Presentations/Lecture%202/Ch11_LPIntro.pdf.
Hesham Mostafa et al., "Parameter Efficient Training of Deep Convolutional Neural Networks by Dynamic Sparse Reparameterization", Proceedings of the 36th Int'l Conference on Machine Learning (PMLR), pp. 4646-4655 (May 24, 2019), http://proceedings.mlr.press/v97/mostafa19a/mostafa19a.pdf.
Junki Park et al., "OPTIMUS: Optimized Matrix Multiplication Structure for Transformer Neural Network Accelerator", Mar. 15, 2020, pp. 363-378, Proceedings of Machine Learning and Systems, vol. 2.
Prajit Ramachandran et al., "Stand-Alone Self-Attention in Vision Models", arXiv:1906.05909v1 [cs.CV], 15 pages (Jun. 13, 2019), https://arxiv.org/pdf/1906.05909.pdf.
Christian Szegedy et al., "Going Deeper with Convolutions", 2015 IEEE Conference on Computer Vision and Pattern Recognition (CVPR), pp. 1-9 (2015), doi: 10.1109/CVPR.2015.7298594.
Dzmitry Bahdanau et al., "Neural Machine Translation by Jointly Learning to Align and Translate", May 19, 2016, 15 pages, arXiv:1409.0473v7 [cs.CL].
Rwan Bello et al., "Attention Augmented Convolutional Networks", 2019, pp. 3286-3295, Proceedings of the IEEE/CVF Int'l Conference on Computer Vision.
Cristian Buciluǎ et al., "Model Compression", Aug. 20, 2006, pp. 535-541, Proceedings of the 12th Assn. for Computing Machinery (ACM) Special Interest Group on Knowledge Discovery in Data (SIGKDD) Int'l Conference on Knowledge Discovery and Data Mining (KDD).
Liang-Chieh Chen et al., "Deeplab: Semantic Image Segmentation with Deep Convolutional Nets, Atrous Convolution, and Fully Connected CRFs", Apr. 27, 2017, pp. 834-848, IEEE transactions on pattern analysis and machine intelligence, vol. 40, No. 4.
Yu Cheng et al., "A Survey of Model Compression and Acceleration for Deep Neural Networks", Jun. 14, 2020, 10 pages, arXiv: 1710.09282v9 [cs.LG].
Aston Zhang et al., "Dive into Deep Learning" Jul. 25, 2021, 323 pages, Release 0.17.0, chs. 4-10 (Jul. 25, 2021), available at: https://d2l.ai/.
Tim Dettmers et al., "Sparse Networks from Scratch: Faster Training without Losing Performance", Aug. 23, 2019, 14 pages, arXiv:1907.04840v2 [cs.LG].
Yu Cheng et al., "A Survey of Model Compression and Acceleration for Deep Neural Networks", Oct. 23, 2017, 10 pages, IEEE Signal Processing Magazine, Special Issue on Deep Learning for Image Understanding.
Jonathan Frankle et al., "The Lottery Ticket Hypothesis: Finding Sparse, Trainable Neural Networks", arXiv:1803.03635v5 [cs.LG], 42 pages (Mar. 4, 2019), https://arxiv.org/pdf/1803.03635.pdf.
Jianping Gou et al., "Knowledge distillation: A survey", Int'l J. of Comp. Vision, vol. 129, No. 6, pp. 1789-1819 (Jun. 2021), https://arxiv.org/pdf/2006.05525.pdf.
Lucas Hansen, "Tiny ImageNet Challenge Submission", CS231n: Convolutional Neural Networks for Visual Recognition, Stanford University, 6 pages (2015), http://cs231n.stanford.edu/reports/2015/pdfs/lucash_final.pdf.
Kaiming He et al., "Deep Residual Learning for Image Recognition", Proceedings of the IEEE conference on computer vision and pattern recognition 2016, pp. 770-778 (2016), https:/openaccess.thecvf.com/content_cvpr_2016/papers/He_Deep_Residual_Learning_CVPR_2016_paper.pdf.
Adrián Hernandez et al., "Attention Mechanisms and Their Applications to Complex Systems", Entropy, vol. 23, No. 3, p. 283, 18 pages (Feb. 26, 2021), https://www.mdpi.com/1099-4300/23/3/283/htm.
Geoffrey Hinton et al., "Distilling the Knowledge in a Neural Network", arXiv preprint arXiv:1503.02531, 9 pages (Mar. 9, 2015), https://arxiv.org/pdf/1503.02531.pdf.
Le Hou et al., "High Resolution Medical Image Analysis with Spatial Partitioning", arXiv:1909.03108v3 [eess.IV], 5 pages (Sep. 12, 2019), https://arxiv.org/pdf/1909.03108.pdf.
Cheng-Zhi Anna Huang et al., "Music Transformer: Generating Music with Long-Term Structure", arXiv:1809.04281v3 [cs.LG], 14 pages (Dec. 12, 2018), https://arxiv.org/pdf/1809.04281.pdf.
Judit Ács, "Masking attention weights in PyTorch", Judit Ács's blog, 4 pages (Dec. 27, 2018; last visited Oct. 2, 2021), http://juditacs.github.io/2018/12/27/masked-attention.html.
Salman Khan et al., "Transformers in Vision: A Survey", arXiv:2101.01169v2 [cs.CV], 28 pages (Feb. 22, 2021), https://arxiv.org/pdf/2101.01169v2.pdf.
Taehyeon Kim et al., "Comparing Kullback-Leibler Divergence and Mean Squared Error Loss in Knowledge Distillation", 2021, pp. 2628-2635, (Proceedings of the Thirtieth International Joint Conference on Artificial Intelligence (IJCAI-21), 2021).
Taehyeon Kim et al., "Comparing Kullback-Leibler Divergence and Mean Squared Error Loss in Knowledge Distillation", May 19, 2021, 11 pages, arXiv:2105.08919 [cs.LG].
Salman Khan et al., "Transformers in Vision: A Survey", ACM Computing Surveys, 38 pages (Accepted Dec. 2021; available online Jan. 6, 2022), https://dl.acm.org/doi/abs/10.1145/3505244.
Song Han et al., "Deep Compression: Compressing Deep Neural Networks with Pruning, Trained Quantization and Huffman Coding", arXiv: 1510.00149v5 [cs.CV], 14 pages (Feb. 15, 2016).
Andrew Howard et al., "Searching for MobileNetV3", Proceedings of the IEEE/Computer Vision Foundation (CVF) Int'l Conference on Computer Vision (ICCV 2019), pp. 1314-1324 (Oct. 2019).

(56) References Cited

OTHER PUBLICATIONS

Liam Li et al., "Geometry-Aware Gradient Algorithms for Neural Architecture Search", arXiv:2004.07802v5 [cs.LG], 25 pages (Mar. 18, 2021).

Mu Li et al., "Scaling Distributed Machine Learning with the Parameter Server", 11th USENIX Symposium on Operating Systems Design and Implementation (OSDI '14), pp. 583-598 (Oct. 2014).

Misha Khodak et al., "In defense of weight-sharing for neural architecture search: an optimization perspective", Machine Learning Blog Carnegie Mellon University (ML@CMU), 12 pages (Jul. 17, 2020), https://blog.ml.cmu.edu/2020/07/17/in-defense-of-weight-sharing-for-nas/.

Hieu Pham et al. "Efficient Neural Architecture Search via Parameters Sharing", Proceedings of the 35th Int'l Conference on Machine Learning (PMLR), vol. 80, pp. 4095-4104 (2018).

Aurick Qiao et al., "Litz: Elastic Framework for High-Performance DistributedMachine Learning", 2018 USENIX Annual Technical Conference (USENIX ATC '18), pp. 631-643 (Jul. 2018).

Mohammad Rastegari et al. "XNOR-Net: Imagenet Classification Using Binary Convolutional Neural Networks", European Conference on Computer Vision (ECCV), Springer, Cham., pp. 525-542 (Oct. 8, 2016).

Lingxi Xie et al., "Weight-Sharing Neural Architecture Search: A Battle to Shrink the Optimization Gap", arXiv:2008.01475v2 [cs.CV], 24 pages (Aug. 5, 2020).

Yuge Zhang et al., "Deeper Insights Into Weight Sharing in Neural Architecture Search", arXiv:2001.01431v1 [cs.LG], 16 pages (Jan. 6, 2020).

Extended European Search Report mailed Jan. 2, 2023 for European Patent Application No. 22186944.9, 14 pages.

Tang et al., "A Semi-Supervised Assessor of Neural Architectures", arXiv:2005.06821v1 [cs.CV], arxiv.org, Cornell Univ. Library, Ithaca, NY, 10 pages (May 14, 2020).

Kokiopoulou et al., "Fast Task-Aware Architecture Inference", arXiv:1902.05781v1 [cs.LG], arxiv.org, Cornell Univ. Library, Ithaca, NY, 10 pages (Feb. 15, 2019).

Zichao Lu et al., "NSGANetV2: Evolutionary Multi-objective Surrogate—Assisted Neural Architecture Search", Computer Vision—ECCV 2020: 16th European Conference, Glasgow, UK, Aug. 23-28, 2020, pp. 35-51 (Aug. 2020).

Extended European Search Report mailed Jan. 10, 2023 for European Patent Application No. 22186932.4, 9 pages.

"Intel Agilex FSeries 027 FPGA R25A Product Specifications" retrieved on Oct. 6, 2021, 3 pages. Retrieved from Internet at: https://www.intel.com/content/www/us/en/products/sku/208599/intel-agilex-fseries-027-fpga-r25a/specifications.html.

"Intel Atom x6413E Processor Product Specifications", retrieved on Oct. 6, 2021, 4 pages. Retrieved from Internet at https://ark.intel.com/content/www/us/en/ark/products/207908/intel-atom-x6413e-processor-1-5m-cache-up-to-3-00-ghz.html.

"Intel® Xeon® Platinum 8362 Processor Product Specifications" retrieved on Oct. 6, 2021, 4 pages. Retrieved from Internet at: https://www.intel.com/content/www/us/en/products/sku/217216/intel-xeon-platinum-8362-processor-48m-cache-2-80-ghz/specifications.html.

Mahrokh Javadi et al., "Combining Manhattan and Crowding distances in Decision Space for Multimodal Multi-objective Optimization Problems", Sep. 12, 2019, 6 pages, Eurogen 2019.

Will Koehrsen, "A Conceptual Explanation of Bayesian Hyperparameter Optimization for Machine Learning", Jun. 28, 20218, 17 pages, Toward Data Science, available at: https://towardsdatascience.com/a-conceptual-explanation-of-bayesian-model-based-hyperparameter-optimization-for-machine-learning-b8172278050f.

Ianxiao Liu et al., "DARTS: Differentiable Architecture Search", Apr. 23, 2019, 13 pages, arXiv:1806.09055v2 [cs.LG].

Joseph Mellor et al., "Neural Architecture Search without Training", Jul. 1, 2021, pp. 7588-7598, Int'l Conference on Machine Learning, PMLR.

Jasper Snoek et al., "Practical Bayesian Optimization of Machine Learning Algorithms", Aug. 29, 2012, 9 pages, Advances in Neural Information Processing Systems 25 (NIPS 2012).

Eckart Zitzler et al., "SPEA2: Improving the Strength Pareto Evolutionary Algorithm", May 2001, 21 pages, Computer Engineering and Communication Networks Lab (TIK), Swiss Fed. Inst. of Tech. (ETH), Zurich, CH, TIK-Report 103.

Hanrui Wang et al., "HAT: Hardware-Aware Transformers for Efficient Natural Language Processing", May 28, 2020, 14 pages, arXiv:2005.14187v1 [cs.CL].

Hanrui Wang et al., "HAT: Hardware-Aware Transformers for Efficient Natural Language Processing", 2020, 37 pages, ACL 2020 Slides, available at: https://hat.mit.edu/assets/ACL20_HAT_HanruiWang.pdf.

Mohamed S. Abdelfattah et al., "Zero-Cost Proxies for Lightweight NAS", Mar. 19, 2021, 17 pages, arXiv:2101.08134v2 [cs.LG].

Edward Alibekov et al., "Proxy Functions for Approximate Reinforcement Learning", 2019, pp. 224-229, IFAC PapersOnLine 52-11.

Bowen Baker et al., "Designing Neural Network Architectures using Reinforcement Learning", Mar. 22, 2017, 18 pages, arXiv:1611.02167v3.

Han Cai et al., "Proxylessnas: Direct neural architecture search on target task and hardware", Feb. 23, 2019, 13 pages, arXiv:1812.00332v2 [cs.LG].

Olivier Chapelle et al., "Semi-Supervised Learning", 2006, 524 pages, MIT Press, Cambridge MA, London England.

Thomas Elsken et al., "Neural architecture search: A survey", Mar. 19, 2019, 21 pages, J. of Machine Learning Research, vol. 20, No. 1.

Thomas N. Kipf et al., "Semi-Supervised Classification with Graph Convolutional Networks", Feb. 22, 2017, 14 pages, arXiv:1609.02907v4.

M. Z. Naser et al., "Insights into Performance Fitness and Error Metrics for Machine Learning", May 17, 2020, 25 pages, arXiv:2006.00887v1.

Kenneth O. Stanley et al., "Evolving Neural Networks through Augmenting Topologies", Jun. 2002, pp. 99-127, Evolutionary Computation, vol. 10, No. 2.

Mingxing Tan et al., "EfficientNet: Rethinking Model Scaling for Convolutional Neural Networks", May 24, 2019, pp. 6105-6114, Int'l Conference on Machine Learning, PMLR.

Jack Turner et al., "BlockSwap: Fisher-guided Block Substitution for Network Compression on a Budget", Jan. 23, 2020, 15 pages, arXiv:1906.04113v2.

Jesper E. Van Engelen et al., "A survey on semi-supervised learning", Nov. 15, 20219, pp. 373-440, Machine Learning, vol. 109, No. 2.

Barret Zoph et al., "Neural Architecture Search with Reinforcement Learning", Feb. 15, 2017, 16 pages, arXiv:1611.01578v2.

Kalyanmoy Deb, "Multi-Objective Optimization Using Evolutionary Algorithms", Indian Institute of Technology—Kanpur, Dept. of Mechanical Engineering, Kanpur, India, KanGAL Report No. 2011003, 24 pages (Feb. 10, 2011), https://www.egr.msu.edu/~kdeb/papers/k2011003.pdf.

Zhichao Lu et al., "NSGA-Net: Neural Architecture Search using Multi-Objective Genetic Algorithm", arXiv:1810.03522v2 [cs.CV], 13 pages (Apr. 18, 2019).

Yonglong Tian et al., "Contrastive Representation Distillation", arXiv:1910.10699v2 [cs.LG], 19 pages (Jan. 18, 2020).

Tianyun Zhang et al., "A Systematic DNN Weight Pruning Framework using Alternating Direction Method of Multipliers", Proceedings of the European Conference on Computer Vision (ECCV) 2018, in Lecture Notes in Computer Science book series (LNCS), vol. 11212, pp. 191-207 (Oct. 7, 2018), https://openaccess.thecvf.com/content_ECCV_2018/papers/Tianyun_Zhang_A_Systematic_DNN_ECCV_2018_paper.pdf.

Ashish Vaswani et al., "Attention Is All You Need", Advances in Neural Information Processing Systems 30 (NIPS 2017), pp. 5998-6008 (2017), https://proceedings.neurips.cc/paper/2017/file/3f5ee243547dee91fbd053c1c4a845aa-Paper.pdf.

(56) References Cited

OTHER PUBLICATIONS

Chunnan Wang et al., "Multi-Objective Neural Architecture Search Based on Diverse Structures and Adaptive Recommendation", arXiv:2007.02749v2 [cs.CV], 11 pages (Aug. 13, 2020), https://arxiv.org/pdf/2007.02749.pdf.

Sergey Zagoruyko et al., "Paying More Attention to Attention: Improving the Performance of Convolutional Neural Networks via Attention Transfer", arXiv:1612.03928v3 [cs.CV], 13 pages (Feb. 12, 2017), https://arxiv.org/pdf/1612.03928.pdf.

Chenzhuo Zhu et al., "Trained Ternary Quantization", arXiv:1612.01064v3 [cs.LG], 10 pages (Feb. 23, 2017), https://arxiv.org/pdf/1612.01064.pdf.

Barret Zoph et al., "Learning Transferable Architectures for Scalable Image Recognition", Proceedings of the IEEE conference on computer vision and pattern recognition 2018, pp. 8697-8710 (2018), https://openaccess.thecvf.com/content_cvpr_2018/papers/Zoph_Learning_Transferable_Architectures_CVPR_2018_paper.pdf.

James Bergstra et al., "Algorithms for Hyper-Parameter Optimization", 2011, 9 pages, Advances in Neural Information Processing Systems 24 (NIPS 2011).

James Bergstra et al., "Random Search for Hyper-Parameter Optimization", Feb. 1, 2012, 25 pages, J. of Machine Learning Research, vol. 13, No. 2.

Han Cai et al., "Once-For-All: Train One Network and Specialize for Efficient Deployment", Apr. 29, 2020, 15 pages, arXiv:1908.09791v5 [cs.LG].

Kalyanmoy Deb et al., "A Fast and Elitist Multiobjective Genetic Algorithm: NSGA-II", Apr. 2002, 16 pages, IEEE Transactions on Evolutionary Computation, vol. 6, No. 2.

Ian Dewancker et al., "Bayesian Optimization Primer", 2020, 4 pages. Retrieved from the Internet: http://static.sigopt.com/b/20a144d208ef255d3b981ce419667ec25d8412e2/static/pdf/SigOpt_Bayesian_Optimization_Primer.pdf.

Ian Dewancker et al., "Bayesian Optimization for Machine Learning: A Practical Guidebook", Dec. 14, 2016, 15 pages, arXiv preprint arXiv:1612.04858.

A.E. Eiben et al., "Introduction to Evolutionary Computing", 2015, 295 pages, second edition, Springer Heidelberg New York Dordrecht London.

Wenlan Huang et al., "Survey on Multi-Objective Evolutionary Algorithms", Aug. 1, 2019, 8 p. IOP Conf. Series: J. of Physics: Conf. Series, vol. 1288, No. 1, p. 012057.

Christian Igel et al., "Covariance Matrix Adaptation for Multi-objective Optimization", 2007, pp. 1-28, Evolutionary Computation, vol. 15, No. 1.

Danilo Vasconcellos Vargas et al., "General Subpopulation Framework and Taming the Conflict Inside Populations", Jan. 2, 2019, 37 pages, arXiv:1901.00266v1 [cs.NE].

\* cited by examiner

MACHINE LEARNING MODEL SCALING SYSTEM WITH ENERGY EFFICIENT NETWORK DATA TRANSFER FOR POWER AWARE HARDWARE

TECHNICAL FIELD

Embodiments described herein generally relate to artificial intelligence (AI), machine learning (ML), and Neural Architecture Search (NAS) technologies, and in particular, to techniques for hardware-aware AI/ML model searching.

BACKGROUND

Machine learning (ML) is the study of computer algorithms that improve automatically through experience and by the use of data. Performing machine learning involves creating a statistical model (or simply a "model"), which is configured to process data to make predictions and/or inferences. ML algorithms build models using sample data (referred to as "training data") and/or based on past experience in order to make predictions or decisions without being explicitly programmed to do so. The efficiency of an ML model, in terms of resource consumption, speed, accuracy, and other performance metrics, are based in part on the number and type of model parameters and/or hyperparameters used for the ML model. Changes to model parameters and/or hyperparameters can greatly impact the performance of a given ML model. In particular, reducing the number of parameters may decrease the accuracy of a model, but may allow the model to run faster and use less memory than it would with a larger number of parameters.

ML model design is a lengthy process that involves a highly iterative cycle of training and validation to tune the structure, parameters, and/or hyperparameters of a given ML model. The training and validation can be especially time consuming and resource intensive for larger ML architectures such as deep neural networks (DNNs) and the like. Conventional ML design techniques may also require relatively large amounts of computational resources beyond the reach of many users. Furthermore, in many cases these ML models (e.g., DNNs) are not particularly optimized for inference across different hardware platforms (e.g., different central processing units (CPUs), graphics processing units (GPUs), mobile devices, System of Chip (SoC) devices, Internet of Things (IoT) devices, etc.).

Instead of manually designing an ML model, Neural Architecture Search (NAS) algorithms can be used to automatically discover an ideal ML model for a particular task (see e.g., Abdelfattah et al., "Zero-Cost Proxies for Lightweight NAS." ArXiv abs/2101.08134 (20 Jan. 2021) ("[Abdelfattah]")). NAS is a process of automating architecture engineering. However, NAS can also be time consuming and computationally intensive. Typically, using NAS can take many hours or days to fully train a single neural network (see [Abdelfattah]). Conventional NAS techniques are time consuming and computationally resource hungry.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
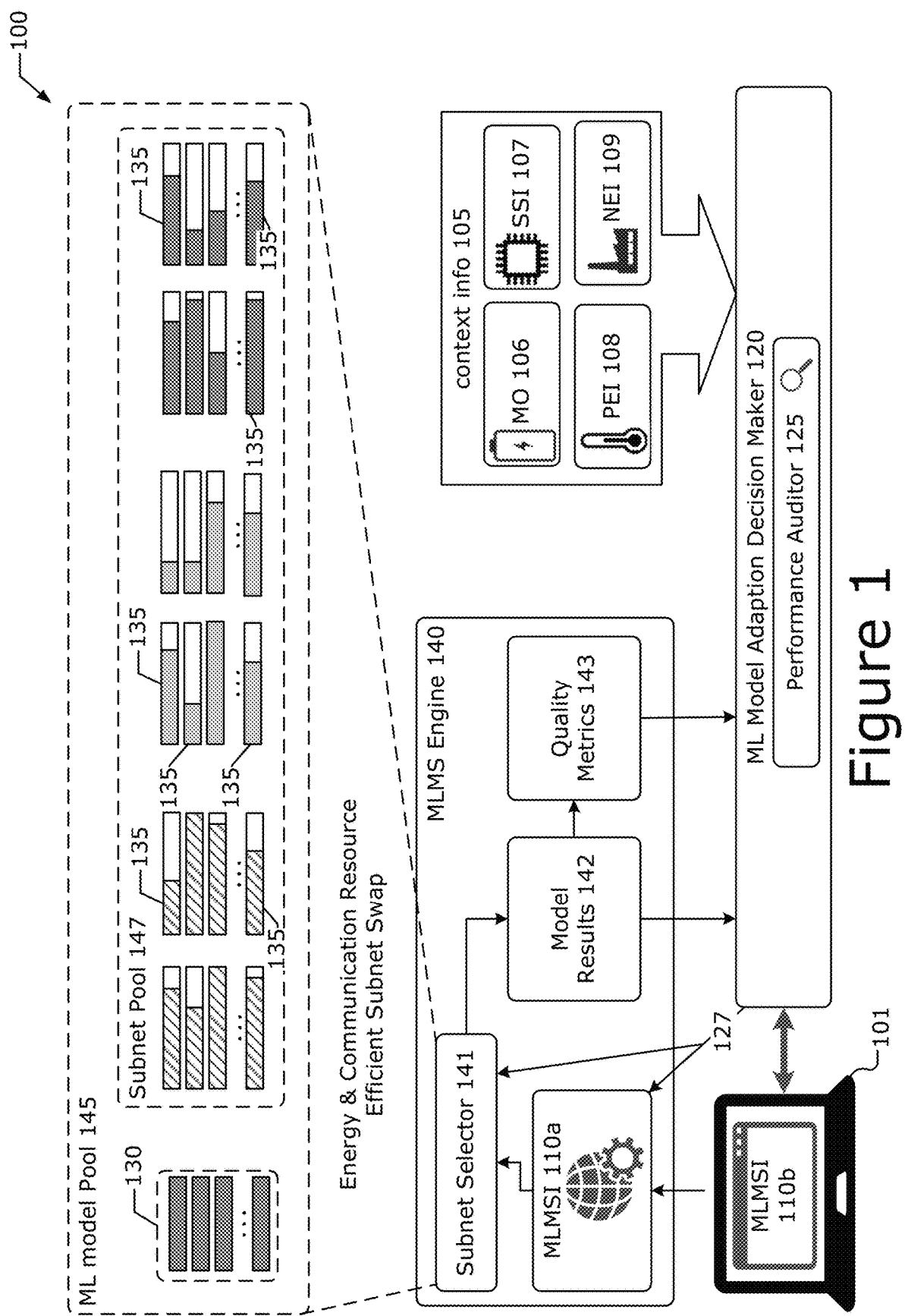
FIG. 1 depicts an overview of a machine learning model swapping (MLMS) system according to various embodiments.

The present disclosure is related to techniques for optimizing artificial intelligence (AI) and/or machine learning (ML) models to reduce resource consumption while improving AI/ML model performance. In particular, the present disclosure provides a ML architecture search (MLAS) framework that involves generalized and/or hardware (HW)-aware ML architectures.

AI/ML researchers are continually pushing the state-of-the-art by creating new ML models and algorithms (e.g., including DNNs) for different application domains (e.g., computer vision, language translation, etc.). In many cases, the ML models are created and evaluated on the HW platform available to the researcher at the time (e.g., a desktop computer with a standard consumer-based platform and/or a graphics processing unit (GPU)). Furthermore, researchers may only consider a narrow set of performance metrics (e.g., accuracy) when evaluating the ML model. Therefore, the ML model is inherently optimized for the HW platform available to the researcher at the time of researching and the particular metrics researched. Users trying to solve the same problem for which the ML model was designed may only have access to different HW platforms than those used by AI/ML researchers, or may have a particular HW platform in mind for deployment of a particular ML model. Furthermore, some users may be interested in different and/or multiple performance metrics (e.g., accuracy, latency, power consumption, etc.). The performance of the ML model provided by the researcher is then suboptimal for these users.

However, optimizing an ML model for individual HW platforms and specific performance metrics is a very time-consuming effort, which requires highly specialized knowledge. This type of optimization is typically done manually with a great deal of in-depth understanding of the HW platform since certain characteristics of the HW platform (e.g., clock speed, number of processor cores, amount of cache memory, etc.) will affect the optimization process. The optimization process is also affected by the characteristics of the input data to the ML model (e.g., batch size, image size, number of epochs/iterations, etc.). Finally, any change to the performance metrics (e.g., going from latency to power consumption), input data characteristics (e.g., increasing the batch size), HW characteristics (e.g., increasing the number of processor cores) or HW platform (e.g., going from a GPU to CPU) would require starting this expensive optimization process again.

Moreover, AI/ML applications are used in a large variety of hardware platforms spanning various market segments such as cloud, edge, and client devices. As computing systems and network technologies become more widespread, different computing systems/devices may be deployed in a multitude of environments subjecting those systems/devices to varying environmental conditions. In a first example, as parts of servers are migrated from the cloud (e.g., data centers) to edge computing environments, these servers may experience environmental conditions different than those typically encountered within a data center. In another example, IoT devices, such as autonomous sensors, may need to be deployed in a multitude of environments from inside factories or manufacturing plants, inside other devices, in urban environments, and wilderness regions.

While there is a strong industry and research focus on ML model optimization for different HW platforms, there is little focus on how ML models (e.g., DNNs) should be selected and deployed (or interchanged) within a particular HW platform in an efficient manner. The present disclosure provides an ML model scaling (MLMS) system that selects and deploys ML models in an energy and communication efficient way while at the same time accounting for real-time changes in system/HW constraints. Furthermore, the MLMS system discussed herein is highly robust in adapting to a wide variety of HW platform combinations.

Currently, there are no existing solutions that directly address selecting and interchanging ML models in an energy and communication (data transfer) efficient way. Tangentially, for model adaptation, existing solutions that focus on adapting ML models with respect to changing HW power constraints define specific and separate models for each possible hardware power mode, for example, defining a smaller DNN model with fewer parameters for an HW platform operating in a low power mode and a separate larger model for the HW platform operating in the high-power mode (see e.g., Howard et al., "Searching for MobileNetV3", Proceedings of the IEEE/Computer Vision Foundation (CVF) Intl Conference on Computer Vision (ICCV 2019), pp. 1314-1324 (October 2019) ("[Howard]"), the contents of which are hereby incorporated by reference in its entirety). However, when taking into account relatively small changes in HW configurations, there may be about $10^{19}$ different solutions that need to be searched for training these separate ML models. Furthermore, the ML model parameter count correlates to multiply-and-accumulate (MACs) operations, and hence power consumption. Therefore, in the existing solutions, each hardware power mode would require a manual search or NAS to be performed. These existing solutions neglect the energy/communication overhead of deploying or replacing an ML model (e.g., DNN models or the like). No currently existing solutions adapt how ML models are deployed and/or replaced based on changing system constraints.

The present disclosure provides an MLMS system that selects and interchanges ML models (e.g., subnets) in an energy and communication efficient way while adapting the ML models (e.g., subnets) to real time (or near-real time) changes in system (HW platform) constraints. The MLMS system discussed herein is agnostic to particular approach used for ML model search (e.g., NAS) and for ML model (e.g., supernet) weight sharing. The MLMS system implements a unique and robust ML model search and swap strategy that can flexibly adapt ML models for a wide variety of detected compute system operational changes and/or environmental changes. Energy and communication efficiency is achieved by using a similarity-based ML model selection process, wherein the MLMS system selects a replacement ML model that has the most overlap in pre-trained parameters from a currently deployed ML model (e.g., a pre-trained supernet) to minimize memory write operation overhead.

The MLMS system discussed herein allows prediction/inference tasks to be performed on a HW platform under dynamically varying environmental conditions (e.g., temperature, battery charge) and HW configurations (e.g. utilized cores, power modes, etc.) while maintaining the same or similar level of performance of prediction/inference results (e.g., accuracy, latency, etc.) as if the HW platform were operated in a more stable environment and/or with static HW configurations. Furthermore, the MLMS system discussed herein provides a relatively low dynamic power signature (e.g., during ML model swapping) and a relatively fast memory write time and/or model loading time during model interchange operations.

The MLMS system holistically adapts ML models to broad range of AI/ML applications (e.g., image recognition, segmentation, recommendation, language translation, etc.) and hardware scenarios for various key performance indicators (KPIs) such as power, throughput, performance, and the like. The incorporation of energy-efficient ML model swapping reduces an AI/ML application's data transfer costs (in terms of resource consumption) and provides a unique advantage to power and performance for resource constrained HW platforms such as, for example, edge compute nodes, IoT devices, SoCs, and/or the like. Furthermore, by streamlining elastic supernet approaches with the MLMS system discussed herein, a robust and highly adaptive ML model swapping capabilities are realized that will guarantee optimal model selection for a wide range of system constraints and configurations in real time (or near real time).

1. Machine Learning (Ml) Model Swapping Framework 1.1. System Overview

FIG. 1 shows the main components and interactions of an ML model scaling (MLMS) system 100. MLMS system 100 provides a holistic system that selects and interchanges ML models in an energy and communication efficient way while at the same time adapting the models to real-time changes in system constraints, conditions, and/or configurations. The MLMS system 100 is agnostic to the particular ML model being operated/deployed. The MLMS system 100 achieves energy and communication efficiency by using a similarity-based subnet selection process where a subnet is selected from a pool of subnets that has the most overlap in pre-trained parameters from the existing subnet to minimize memory write operation overhead. The MLMS system 100 includes an MLMS engine 140 and an ML model adaptation decision maker 120, which includes a performance auditor 125. The MLMS engine 140 includes an MLMS interface (MLMSI) 110, a subnet selector 141, which provides inference model results 142 and application quality metrics 143 to the performance auditor 125 via the ML model adaptation decision maker 120.

In FIG. 1, a client device 101 provides an ML configuration (config) to the MLMSI 110a. In this example, the client device 101 is shown as a laptop computer, however, the client device 101 may be any other type of client or user device such as those discussed herein. To interact with the MLMSI 110a, the client device 101 operates an MLMSI client application (app) 110b (hereinafter referred to as "MLMSI 110b"), which may be a suitable client such as web browser, a desktop app, mobile app, a web app, and/or other like element that is configured to operate with the MLMSI 110a via a suitable communication protocol (e.g., hypertext transfer protocol (HTTP) (or variants thereof), Message Queue Telemetry Transport (MQTT), Real Time Streaming Protocol (RTSP), and/or the like). The MLMSI 110a allows a user of the client device 101 to manage (or specify) how the MLMS system 100 is to search for an optimal ML architecture.

For purposes of the present disclosure, the term "ML architecture" may refer to a particular ML model having a particular set of ML parameters and/or such an ML model configured to be operated on a particular HW platform. Here, the set of ML parameters may refer to "model parameters" (also referred to simply as "parameters") and/or "hyperparameters." Model parameters are parameters derived via training, whereas hyperparameters are parameters whose values are used to control aspects of the learning process and usually have to be set before running an ML model (e.g., weights, etc.). Additionally, for purposes of the present disclosure, hyperparameters may be classified as architectural hyperparameters or training hyperparameters. Architectural hyperparameters are hyperparameters that are related to architectural aspects of an ML model such as, for example, the number of layers in a DNN, specific layer types in a DNN (e.g., convolutional layers, multilayer perception (MLP) layers, etc.), number of output channels, kernel size, and/or the like. Training hyperparameters are hyperparameters that control an ML model's training process such as, for example, number of epochs, learning rate, and the like. For purposes of the present disclosure, the term "ML parameter" as used herein may refer to model parameters, hyperparameters, or both model parameters and hyperparameters unless the context dictates otherwise.

The MLMSI 110a is a server-side app or the like that allows a user to provide inputs to the system 100 using their MLMSI 110b. For example, the MLMSI 110a and MLMSI 110b (collectively referred to as "MLMSI 110") provides a platform or framework that allows ML model designers, developers, and/or other types of users to create, edit, and/or manipulate ML models and/or ML applications. The MLMSI 110 comprises a graphical user interface (GUI) including various graphical elements/objects that allow users to add, update, and/or change various ML architecture search parameters and/or (pre-trained) supernet, and/or other like ML model aspects. The MLMSI 110 also allows the user of the client device 101 to obtain (e.g., download) ML architectures/models discovered by the MLMS system 100. In some implementations, the MLMSI 110b may be a command line interface and/or a development environment that is the same or similar to a software development environment (SDE), an integrated development environment (IDE), a software development kit (SDK), a software development platform (SDP), etc., that are used for app development. In various implementations, the MLMSI 110 may include a suitable file transfer mechanism or upload component that enables the user of the client device 101 to supply the ML config to the system 100. Additionally, the MLMSI 110a includes application programming interfaces (APIs) to access the other subsystems of system 100, manages ML search parameter updates (e.g., new or updated ML config), and calls any supported ML operations library (e.g., as indicated by the ML config).

In alternative implementations, the MLMS system 100 may be operated by the same compute node (e.g., client device, edge compute node, network access node, cloud service, drone, network appliance, etc.). In these implementations, the MLMSI 110 may be a suitable application programming interface (API), middleware, or some other interface between one or more applications and/or components of the compute node.

In various implementations, the ML config includes a reference ML model 130 (referred to herein as a "super network 130" or "supernet 130"), application quality metrics, system constraints, and/or performance auditor settings. The supernet 130 may be an ML model configured and/or trained for a particular AI/ML task from which the MLMS system 100 is to discover or generate a smaller and/or derivative ML model (referred to herein as a "sub-network" or "subnet"). The supernet may contain an overparameterized set of operations from which one or more subnets 135 are selected during operation of the MLMS system 100. As an example, a supernet 130 may be a relatively large, overparameterized, and/or dense ML model that an end-user has developed, but is expensive to operate in terms of computation, storage, and/or power consumption. This supernet 130 may include parameters and/or weights that do not significantly contribute to the prediction and/or inference determination, and these parameters and/or weights contribute to the supernet's overall computational complexity and density. Therefore, the supernet 130 contains one or more smaller subnets (e.g., the subnets 135 in the subnet pool 147 in FIG. 1) that, when trained in isolation, can match and/or offer trade-offs in various objectives and/or performance metrics such as accuracy and/or latency of the original supernet 130 when trained for the same number of iterations or epochs. A supernet 130 allows for many trade offs in objectives in view of subnets 135, but in some cases, subnets 135 are not guaranteed to beat the supernet 130 in every objective. In some implementations, the user-supplied supernet 130 may be pre-trained, or the MLMS system 100 may train the supernet 130. Furthermore, the supernet 130 may be an elastic supernet 130, which may be a supernet with elastic ML parameters. Here, "elasticity" refers to a component in the supernet 130 and its corresponding operator can change in several dimensions. For example, in convolutional networks this would allow for the choice of different kernel sizes (e.g., elastic kernel), depths of some group of elements (e.g., elastic depth), and number of channels of the selected components (e.g., elastic width). In the context of the present disclosure, the term "elastic" refers to the ability of an elastic supernet 130 to add and/or remove different ML parameters and/or subnets 135 without restarting the running framework and/or the running ML model. Additionally or alternatively, an elastic subnet 135 may 'add' or 'remove' a model component (e.g., block depth) with respect to another subnet 135. The elastic parameters are vectorized in such a way where the MLMS engine 140 can track the different subnets 135 to perform the energy efficient swap (see e.g., FIG. 2 discussed infra). In other implementations, other data structures, such as computational graphs, may be used instead of vectorization. Conventional approaches typically train and fine tune separate ML models for different HW platforms, and those ML models can have a very different architectural configurations, signatures, and/or fingerprints that would make an efficient swap much harder to perform.

The application quality metrics are values and/or thresholds used to determine one or more prediction or inference result indicators the end-user deems important to track and/or an acceptable bounds/range of such results. The prediction or inference result indicators may be based on one or more performance metrics of the currently deployed supernet 130 or subnet 135 that are used to trigger an MLMS. Examples of the performance metrics that may be used for the application quality metrics are discussed infra in section 1.4.

The system constraints are values and/or thresholds used to determine one or more system state changes the end-user deems important to track and/or acceptable ranges/bounds of such system status (operational) changes. For example, the system constraints may indicate specific voltage or current load ranges/values of one or more HW components, memory utilization ranges/values, processor utilization ranges/values, power/energy levels, operating system (OS) statuses/indicators, application requirements to be met (or not met), and/or combination(s) thereof that should be used to trigger a new MLMS. Examples of the different types of parameters, metrics, and/or measures that may be used for the system constraints are discussed infra in section 1.2.

The performance auditor settings are values, parameters, etc., used to determine a combination of prediction/inference results 142, quality metrics 143, and context info 105 (e.g., software (SW) and/or HW conditions) changes that trigger a new search and MLMS. For example, the performance auditor settings may define different combinations of the application quality metrics and/or system constraints that should be used to trigger an MLMS. In some implementations, the performance auditor settings may include different search parameters to be used by the subnet selector 141 to search for a suitable replacement subnet 135 based on the detected system constraints/operational changes.

Additionally or alternatively, the ML config includes values, variables, objects, data, or other information including or indicating a desired one or more of AI/ML domain(s), AI/ML task(s), suitable dataset(s), supported libraries (e.g., PyTorch, TensorFlow, Apache™ MXNet, etc.), HW platform information (HPI), performance metrics (e.g., latency, accuracy, power consumption, etc.), ML parameters, and/or other like parameters, information, and/or data.

The AI/ML tasks may describe a desired problem to be solved and the AI/ML domain may describe a desired goal to be achieved. Examples of ML tasks include clustering, classification, regression, anomaly detection, data cleaning, automated ML (autoML), association rules learning, reinforcement learning, structured prediction, feature engineering, feature learning, online learning, supervised learning, semi-supervised learning (SSL), unsupervised learning, machine learned ranking (MLR), grammar induction, and/or the like. ML domains include, reasoning and problem solving, knowledge representation and/or ontology, automated planning, natural language processing (NLP), perception (e.g., computer vision, speech recognition, etc.), autonomous motion and manipulation (e.g., localization, robotic movement/travel, autonomous driving, etc.), social intelligence, reinforcement learning, etc.

The ML config can also include an appropriately formatted dataset (or a reference to such a dataset). Here, an appropriately formatted dataset refers to a dataset that corresponds to a specific ML architecture, a specified AI/ML task, and/or AI/ML domain. For example, a dataset that would be used for the NLP domain would likely be different than a dataset used for the computer vision domain. The dataset(s) is/are collections of data, which may include one or more database tables, electronic documents, files, and/or other data structures. The dataset(s) may be in any suitable format such as a columnar file format (e.g., Hierarchical Data Format (HDF) including HDF4, HDF5, etc.; Hadoop distributed file system (HDFS); Apache® Parquet; petastorm; etc.), a tabular format (e.g. comma separated values (csv), spreadsheet file formats (e.g., .xlsx, etc.), etc.), a data-serialization format (e.g., Apache® Parquet, ASN.1, Extensible Data Notation (EDN), Efficient XML Interchange (EXI), Google® Protobufs, Google® FlatBuffers, MessagePack, Ethereum® Recursive Length Prefix (RLP), XML, YAML, etc.), Attribute-Relation File Format (ARFF), and/or the like. Additionally or alternatively, the dataset(s) may be specific to a particular type of AI/ML task such as, for example, the Stanford Question Answering Dataset (SQuAD), a Wikipedia® corpus, and/or the Multi-Genre Natural Language Inference (MNLI) dataset for NLP tasks, the ImageNet and/or the Cityscapes datasets for the computer vision (CV) domain, the Modified National Institute of Standards and Technology (MNIST) database for object recognition tasks, and/or the like. Additionally or alternatively, the dataset(s) may be custom set(s) of data gathered and/or prepared by the user of the client device 101.

Additionally, the ML config may include HPI. The HPI may include configuration, specifications, technical details, characteristics, and/or other aspects of a desired HW platform and/or individual HW components on which the user intends to deploy an ML model 130/135. In some implementations, the ML config may include a particular identifier (ID) or information for a specific HW platform (e.g., system model, brand or product line, model number, generation or version number, stock keeping unit (SKU), product line suffix, serial number, device ID, device name, product ID, etc.), which would then be used to obtain relevant information of that platform for the ML architecture search. In one example of these implementations, the ML config may specify a desired system or device such as "Dell® PowerEdge® R750 Rack Server", "Intel® Quark™ SE microcontroller C1000 platform", "Mobotix® M73", "Samsung® Galaxy® S21 Ultra 5G", or the like. Additionally or alternatively, the user can input or otherwise indicate a specific cloud computing platform/service (and optionally, available resources based on their cloud service subscription, account details, etc.) such as, for example, by specifying Google Cloud® Vertex AI, Amazon® SageMaker™, Microsoft® Azure Machine Learning, and/or the like.

Additionally or alternatively, similar IDs/information may be provided for individual HW components (e.g., processor(s), memory devices, chipset, sensor types, etc.) such as, for example, an ID/information for a specific processor, individual memory devices, individual storage devices, motherboard, baseboard, I/O devices, network card, etc. Additionally or alternatively, the ML config may include specifications of different HW devices or platforms such as, for example, processor specifications (e.g., number of cores or threads, clock frequency or clock rate (e.g., base clock rate and/or boosted clock rate), cache size, bus speed, memory bandwidth, thermal design power (TDP), etc.), memory device specifications (e.g., capacity, cell type, stick type, clock frequency, etc.), storage device specifications (e.g., read/write speeds, input/output operations per second (TOPS), storage capacity, memory cell type, etc.), and/or other like specifications such as lithography or semiconductor technology used to manufacture an integrated circuit, and/or the like.

In any of the implementations discussed herein, the ML config may be an information object, file, electronic document, etc., in any suitable form or format such as, for example, a suitable mark-up language document (e.g., HyperText Markup Language (HTML), Extensible Markup Language (XML), AI Markup Language (AIML), JavaScript Object Notation (JSON), generalized markup language (GML), standardized GML (SGML), predictive model markup language (PMML), etc.), a model file format (e.g., Google® protocol buffer files (protobufs, .pb file extension), Keras (.h5 file extension), python (.pkl file extension), PyTorch models (.pt file extension), core ML model (.mlmodel file extension), etc.), a columnar file format (e.g., such as those discussed herein), a tabular file format (e.g., such as those discussed herein), and/or the like.

After the client device 101 provides ML config and/or the supernet 130 to the MLMS engine 140 via the MLMSI 110, the supernet 130 is placed in an ML model pool 145. The ML model pool 145 may be part of the MLMS engine 140, or may be remote from the MLMS engine 140 (e.g., as part of a cloud computing service, and edge computing service, and/or the like). In either implementation, the subnet selector 141 has access to the ML model pool 145. The ML model pool 145 also contains a subnet pool 147, which includes various subnets 135, each of which is adapted from the supernet 130 and optimized for different operational conditions and/or system constraints of a target HW platform. Note that not all subnets 135 are labeled in FIG. 1 for the sake of clarity. The subnets 135 may be generated from the supernet 130 according to processes discussed in U.S. application Ser. No. 17/497,736, U.S. application Ser. No. 17/505,568 filed on 19 Oct. 2021, U.S. application Ser. No. 17/504,282 filed on 18 Oct. 2021, and/or U.S. application Ser. No. 17/504,996 filed on 19 Oct. 2021, the contents of each of which are hereby incorporated by reference in their entireties. Additionally or alternatively, ML model optimization, including HW-aware model compression such as pruning and quantization, may also be used to generate the subnets 135. These methods provide static ML architectures with fixed parameter, FLOPs, and/or latency values that are meant to perform on a HW platform that provides fixed (unchanging) resource (in terms of computation unit/tensor operation, memory, or cores). However, approaches such as quantization could be integrated with the MLMS system 100 in conjunction with the subnet selection 141 (see e.g., Zhu et al., "Trained Ternary Quantization", arXiv:1612.01064v3 [cs.LG] (23 Feb. 2017), Rastegari et al. "XNOR-Net: Imagenet Classification Using Binary Convolutional Neural Networks", European Conference on Computer Vision, Springer, Cham., pp. 525-542 (8 Oct. 2016), Frankle et al., "The Lottery Ticket Hypothesis: Finding Sparse, Trainable Neural Networks", arXiv:1803.03635v5 [cs.LG] (4 Mar. 2019), and Han et al., "Deep Compression: Compressing Deep Neural Networks with Pruning, Trained Quantization and Huffman Coding", arXiv:1510.00149v5 [cs.CV] (15 Feb. 2016), the contents of each of which are hereby incorporated by reference in their entireties). Additionally or alternatively, the MLMS engine 140 (or subnet selector 141) may use one or more ML search functions and/or NAS algorithms, such as those discussed herein, to discover suitable subnets 135 to populate the subnet pool 147.

Receipt of the ML config and/or the supernet 130 causes the performance auditor 125 to begin its background process(es) to monitor the HW platform on which the supernet 130 is deployed (e.g., compute node 550 or the like). In some implementations, the HW platform may be the client device 101. In some implementations, the HW platform may be some other desired compute node or device on which the user wishes to deploy an ML model or wishes to perform some AI/ML task. For example, the user of the client device 101 may specify the HW platform as being one or more IoT devices, autonomous sensors, drones or robots, autonomous vehicles, network appliances, network elements (e.g., base station(s), access point(s), gateway devices, etc.), an edge compute service (e.g., where the ML model will be an edge application), a cloud compute service (e.g., where the ML model will be deployed in a virtual machine or container), and/or the like. In some implementations, the user of the client device 101 may specify multiple different types of HW platforms on which to deploy the same or different ML models. In some implementations, the HW platform may be the same platform that is operating the MLMS engine 130, such as when the HW platform is a highly specialized drone or autonomous vehicle.

During operation, the performance auditor 125 monitors ML model performance based on the inference model results 142 and application quality metrics 143, which are provided by the MLMS engine 140 via the ML model monitor APIs of the ML model adaptation decision maker 120. The performance auditor 125 uses this data/information to monitor for changes in inference/prediction performance in terms of one or more desired performance metrics (e.g., accuracy, latency, and/or other like metrics, such as those discussed herein). The performance metrics include some form of measurement(s) of performance of the generated/discovered ML models/subnets 135. At least in some embodiments, the performance metrics may be referred to as performance indicators, key performance indicators (KPIs), and/or the like. Examples of the performance metrics are discussed infra in section 1.4. The performance metrics that are monitored may be based on the particular AI/ML task and/or AI/ML domain of the supernet 130.

The performance auditor 125 also monitors various context information 105, including the mode of operation (MO) 106 (also referred to as "full-chip power mode 106" or the like), system state information (SSI) 107, physical environment information (PEI) 108, and/or networking environment information (NEI) 109. Additional details of the context information 105 are discussed in more detail infra in section 1.2.

In various implementations, various contextual states (e.g., indicated by metrics 142, 143, MO 106, SSI 107, PEI 108, and/or NEI 109) inform each other, and together are used by the performance auditor 125 to determine a status change of the HW platform on which the supernet 130 (or a subnet) is operating. The status change may be any change in one or more operational conditions of the HW platform as defined by the various metrics/thresholds/settings in the ML config. For example, when a change in the inference latency (e.g., indicated by metrics 142, 143) is detected and/or the one or more HW components passes information that those HW component(s) lost access to several cores/threads (e.g., indicated by computational capacity 107), the performance auditor 125 triggers the subnet selector 141 to perform a subnet search to find a better replacement subnet for the new hardware constraints. The performance auditor 125 triggers the subnet search by generating a status change indicator 127 (also referred to as a "trigger 127"), and sending it to the subnet selector 141 directly or via the MLMSI 110a. The status change indicator 127 may include information about the changed HW conditions and/or inference metrics 142, 143 to assist the subnet selector 141 in identifying a suitable replacement ML model (e.g., subnet) from the subnet pool 147.

Replacing an ML model (e.g., subnet 135) that adapts to the HW changes would normally require a significant amount of data transfer cost (e.g., dynamic write power) to transfer the weights/parameters between models. To further reduce this data transfer cost, an energy and communication efficient MLMS strategy (discussed infra) is employed that mitigates the data transfer costs and/or mitigates other resource consumption overhead. Once a replacement subnet 135 is selected, the performance auditor 125 continues to monitor the inference results 142, quality metrics 143, and context information 105 (e.g., HW platform states, etc.) for indictors that may trigger the next search.

The subnet selector 141 may use one or more ML search functions and/or NAS algorithms to identify a suitable subnet 147 from the subnet pool 147. In some implementations, the subnet selector 141 may implement a multi-objective evolutionary algorithm (MOEA) such as those discussed in Huang et al., "Survey on Multi-Objective Evolutionary Algorithms", IOP Conf. Series: J. of Physics: Conf. Series, vol. 1288, No. 1, p. 012057 (1 Aug. 2019) ("[Huang]") and Deb, "Multi-Objective Optimization Using Evolutionary Algorithms", Indian Institute of Technology-Kanpur, Dept. of Mechanical Engineering, Kanpur, India, KanGAL Report No. 2011003 (10 Feb. 2011), available at: https://www.egr.msu.edu/~kdeb/papers/k2011003.pdf ("[Deb1]"), the contents of each of which are hereby incorporated by reference in their entireties (see also Eiben et al., "Introduction to evolutionary computing", $2^{nd}$ Ed., Springer, Berlin (2015) ("[Eiben]"), the contents of which is hereby incorporated by reference in its entirety). Additionally or alternatively, the subnet selector 141 may implement an enhanced evolutionary algorithm search using diversity preservation (see e.g., Deb et al., "A Fast and Elitist Multiobjective Genetic Algorithm: NSGA-II", IEEE Transactions on Evolutionary Computation, vol. 6, no. 2, (April 2002) ("[Deb2]") and Igel et al., "Covariance Matrix Adaptation for Multi-objective Optimization", Evolutionary Computation, vol. 15, no. 1, pp. 1-28 (1 Mar. 2007) ("[Igel]"), the contents of each of which are hereby incorporated by reference in their entireties). Additionally or alternatively, the subnet selector 141 may implement an enhanced evolutionary algorithm search using non-functional architecture avoidance (see e.g., Stanley et al., "Evolving Neural Networks Through Augmented Topologies", Evolutionary Computation, vol. 10, no. 2, pp. 99-127 (10 Jun. 2002) ("[Stanley]"), the contents of which is hereby incorporated by reference in its entirety). Additionally or alternatively, the subnet selector 141 may implement Strength Pareto Evolutionary Algorithm 2 (SPEA-2) (see e.g., Zitzler et al., "SPEA2: Improving the Performance of the Strength Pareto Evolutionary Algorithm," Technical Report 103, Computer Engineering and Communication Networks Lab (TIK), Swiss Federal Institute of Technology (ETH) Zurich, CH, Tik-Report 103 (May 2001), the contents of which is hereby incorporated by reference in its entirety). Additionally or alternatively, the subnet selector 141 may implement a non-dominated sorting genetic algorithm-II (NSGA-II) (see e.g., [Deb2] and Lu et al., "NSGA-Net: Neural Architecture Search using Multi-Objective Genetic Algorithm", arXiv:1810.03522v2 [cs.CV] (18 Apr. 2019) ("[Lu]"), the contents of which is hereby incorporated by reference in its entirety) and/or the enhanced NSGA-II as discussed in [AD8304-US]. Additionally or alternatively, the subnet selector 141 may implement the multi-objective ML architecture search as discussed in [AD8308-US].

Additionally or alternatively, the subnet selector 141 may implement some other suitable NAS algorithm such as, for example, those discussed in Liu et al., "DARTS: Differentiable Architecture Search", arXiv:1806.09055v2 [cs.LG] (23 Apr. 2019) ("[Liu]"), Cai et al., Once-for-All: Train One Network and Specialize it for Efficient Deployment", arXiv:1908.09791v5 [cs.LG] (29 Apr. 2020) ("[Cai1]"), and Cai et al., "ProxylessNAS: Direct Neural Architecture Search on Target Task and Hardware", arXiv:1812.00332v2 [cs.LG] (23 Feb. 2019) ("[Cai2]"), Wang et al., "HAT: Hardware-Aware Transformers for Efficient Natural Language Processing", arXiv:2005.14187v1 [cs.CL] (28 May 2020) ("[Wang]"), Wang et al., "Multi-Objective Neural Architecture Search Based on Diverse Structures and Adaptive Recommendation", arXiv:2007.02749v2 [cs.CV] (13 Aug. 2020) ("[Wang2]"), Guerrero-Viu et al., "Bag of Baselines for Multi-objective Joint Neural Architecture Search and Hyperparameter Optimization", arXiv:2105.01015v1 [cs.LG] (3 May 2021) ("[Guerrero-Viu]"), Xie et al., "Weight-Sharing Neural Architecture Search: A Battle to Shrink the Optimization Gap", arXiv:2008.01475v2 [cs.CV] (5 Aug. 2020), the contents of each of which are hereby incorporated by reference in their entireties.

Although supernet NAS methods are conducive to real-time ML model selection, various ML model search algorithms and/or other NAS approaches could be substituted. In some implementations, the search algorithm used by the subnet selector 141 is modular and flexible, where different search functions, including new state-of the art algorithms, can be easily swapped in and out of the MLMS engine 140. In this way, different search functions may be used that are better suited for a particular ML architecture and/or a specific type of subnet 135, which can save computational resources and/or provide efficiencies in how those resources are used. In some implementations, an end user (e.g., user of client device 101) may specify in the ML config the particular search function/NAS algorithm they wish to use for the selection process.

1.2. Context Information

As stated previously, a status change event 127 can precipitate a new ML model search and/or swap based on the initially defined threshold definitions and/or values for the performance auditor 125 (e.g., the application quality metric thresholds, HW constraint thresholds, and/or performance auditor settings). When this occurs, a new subnet search is started followed by a new subnet selection (e.g., by the subnet selector 141) that meets the new performance and/or HW constraint criteria. For example, the performance of a deployed ML application can be improved by adapting the deployed ML application to changes in the dynamic state of the underlying HW for categories such as MO 106, SS1 107, PEI 108, and/or NEI 109. The triggering of a new subnet search is based on context information 105 of the HW platform.

The context information 105 may be based on a current system context. The system context of the HW platform (also referred to as "platform context", "contextual information" or simply "context") may be any type of information about how the HW platform is operating and/or the conditions under which the HW platform is operating. The system context may include or indicate an operational mode of the HW platform (e.g., MO 106), a system state of the HW platform (e.g., SSI 107), physical environment of the HW platform (e.g., PEI 108), and/or networking environment of the HW platform (e.g., NEI 109). Additionally or alternatively, the context may include other information, both outside and inside the HW platform, data, and/or conclusions that may be drawn from that information and data.

The MOs 106 (or "power modes 106"), such as sleep mode, idle mode, normal (awake) mode, burst, etc., are defined in the power settings on the HW platform (e.g., firmware or the like) and are triggered when certain conditions or criteria are met (e.g., inactivity, time of day, internal temperature, etc.).

The SSI 107 may include or indicate data about the operational conditions and/or hardware performance metrics of the HW platform (or individual HW components of the HW platform) such as, for example, temperature of individual components, component load, processor performance, computational capacity, memory and/or storage utilization, amount of memory/storage free space, power source state (e.g., power consumption, voltage levels, current levels, etc.) and/or battery state (e.g., available power/energy, thermal data of the battery, etc.), OS and/or application parameters and requirements such as computational needs, input/output characteristics, and volume of exchanged data (upload or download); overload conditions experienced by an application or the HW platform itself; and/or the like. The computational capacity indicates the number of available cores and/or threads. The number of available cores and/or threads can change due to power mode or an in-field event such as a hard radiation event, silicon defect resulting from an issue such as self-heating or electromigration, and/or the like.

The manufacturing process (also referred to as "semiconductor process") may be considered to be a type of SSI 107. The semiconductor process refers to the specific rules on the minimum size and spacing for features on each layer of an chip, integrated circuit, or other HW element. The semiconductor process and/or specific HW elements has/have unique silicon aging effects (Vt), over time which change transistor threshold voltages, and hence power and performance. Additionally, silicon manufacturing process skews or process lots (e.g., fast fast (FF), slow fast (SF), slow slow (SS), fast slow (FS), typical typical (TT)) are known during wafer sort and binning and can inform the power/performance characteristics of the HW platform in terms interconnect and transistor characteristics (e.g., leakage, capacitance, etc.). From this information, expected power usage and/or performance characteristics can be determined based on what the age of the HW platform and various aspects of the silicon manufacturing process itself.

The PEI 108 may include or indicate data about elements outside of the HW platform include various components and peripherals such as batteries, sensors, actuators, etc., and the environment surrounding the HW platform such as, for example, current (outside) temperature, humidity, moisture, altitude, ambient light, ambient sound/volume, information/data related to geographic objects (e.g., mountains) and/or human-created objects (e.g., buildings, highways, etc.), weather data for a given location, and/or other like environmental measurements. Environmental states like temperature have exponential effects of silicon power consumption as they change transistor threshold voltage and interconnect resistance. Various internal and external sensors such as those discussed herein may be used to collect the PEI 108.

The NEI 108 may include or indicate data about network(s) that the HW platform is connected to, or is capable of connecting/attaching to. As examples, the NEI 108 may include one or more of the following: bandwidth (BW), network or cell load, latency, jitter, alpha fairness ("a-fairness"), round trip time (RTT), number of interrupts, out-of-order delivery of data packets, transmission power, bit error rate, bit error ratio (BER), Block Error Rate (BLER), packet delay measurements, packet loss rate, packet reception rate (PRR), packet drop rate, data volume measurements, network connectivity metrics, data transfer rates, network and/or session parameters (e.g., network ID/addresses, session ID, port numbers, etc.), security aspects of a currently attached network, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per bit to interference power density ratio ($E_c/I_0$), peak-to-average power ratio (PAPR), Reference Signal Received Power (RSRP), Received Signal Strength Indicator (RSSI), Reference Signal Received Quality (RSRQ), channel quality indicator (CQI) related measurements, Modulation Coding Scheme (MCS) related measurements, measurements related to Virtualized Resource(s), quality of service (QoS) measurements and/or QoS flow metrics, Mobility Management (MM) information, GNSS timing of cell frames for UE positioning for E-UTRAN or 5G/NR (e.g., a timing between an AP or RAN node reference time and a GNSS-specific reference time for a given GNSS), GNSS code measurements, GNSS carrier phase measurements and/or Accumulated Delta Range (ADR), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021-03-31), 3GPP TS 38.215 v16.4.0 (2020-12), 3GPP TS 28.552 v17.3.1 (2021-06-24), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021-02-26), and/or the like.

In some implementations, the contexts 105 may be based on a pre-assessment of an operational state of the HW platform, which may be based on previously indicated contexts 105. This may involve, for example, evaluating both computation and communication resources needed for different data transfers, threshold criteria or a desired level of reliability, amount or type of compute node capabilities (e.g., a certain processor speed, memory/storage capacity, RAT circuitries implemented by the HW platform, etc.), type of operational constraints under which the HW platform is operating (e.g., radio conditions and/or link quality, a surrounding environmental conditions (e.g., temperature, humidity, altitude, etc.), component temperature, etc.), and/or the like.

The context information 105 may be sensed and/or collected by platform and/or environmental sensing mechanisms. The platform and/or environmental sensing mechanisms may include a system monitor configured to monitor system resources and performance of the HW platform, and to identify detailed information about the HW and SW subsystems implemented by the HW platform. The system monitor is configured to monitor and compile information about installed HW devices (e.g., individual sensors and/or individual actuators embedded or attached to the HW platform), drivers, applications, system settings, system SW programs, AI agents, kernel extensions/modules, etc. implemented by the HW platform.

In some implementations, the system monitor monitors and compiles data from platform/system sensing mechanisms, which may include, for example, temperature sensors of one or more internal components (e.g., processor digital thermal sensors (DTS), system memory thermal sensor on-die (TSOD), thermocouple, Resistance Temp Detector (RTD), thermistors, bipolar junction transistor (BJT), etc.), touch sensors, accelerometers, gyroscopes, altimeters, moisture sensors, humidity sensors, light sensors; ambient light sensors, pressure sensors, signal related sensors (e.g., infrared (IR), laser, etc.), User Presence Detection (UPD) devices, platform power sensors, pressure sensors, magnetometers, proximity sensors (e.g., IR-based), biometric sensors, and/or the like. Additionally or alternatively, the sensing mechanisms may include electricity sensing elements for measuring electricity being produced or consumed by the HW platform such as, for example, electromechanical electricity meters, Seebeck effect devices, hall effect integrated circuits (ICs), fiber optic current sensor (FOCS), metering circuitry including for example, digital signal processors (DSPs), analog-to-digital (ADC) converters, special-purpose microprocessors, and/or the like.

Additionally or alternatively, the system monitor monitors and compiles information about installed hardware devices embedded or attached to the HW platform, drivers, applications, system settings, system software programs, software agents and/or AI agents, kernel extensions/modules, etc. implemented by the HW platform. The compiled information indicates current context information 105 including, for example, system status; processor usage or utilization; processor frequency; processor temperature; currently running processes or tasks; memory usage, utilization, and/or available memory space; memory Self-Monitoring Analysis and Reporting Technology (SMART) indicators; system uptime; network addresses (e.g., IP addresses or the like); network connections; battery charge; battery level threshold; fuel levels; system name or identifier(s); user identifier(s); user permissions; user subscription data; the date and time; and/or other like data/information such as the aforementioned compute node capabilities. The system monitor compiles the system information into a suitable format (e.g., plain text, rich text format (RTF), XML, JSON, etc.), and exports the compiled information to the ML Model Adaption Decision Maker 120 and/or the performance auditor 125.

A supernet-type system offering a robust and fine-grained variety of subnet options 147 suitable for any combination of the aforementioned context information 105. Some contextual constraints 105 change slowly over time (e.g., silicon aging effects) whereas others are highly cyclical (e.g., battery charge). A HW-aware aspect of the MLMS system 100 is that the MLMS system 100 can be used to inform which subnet 135 to use for replacement of a currently provisioned/implemented subnet 135. While the replacement/swapping algorithm discussed herein (see e.g., Table 1 infra) is related to finding a most energy/communication efficient subnet 135 as a replacement, the context information 105 could additionally or alternatively be used to determine how strict the selection of replacement subnets 135 should be.

1.3. Subnet Selection and Swap Strategy

Figure 2:
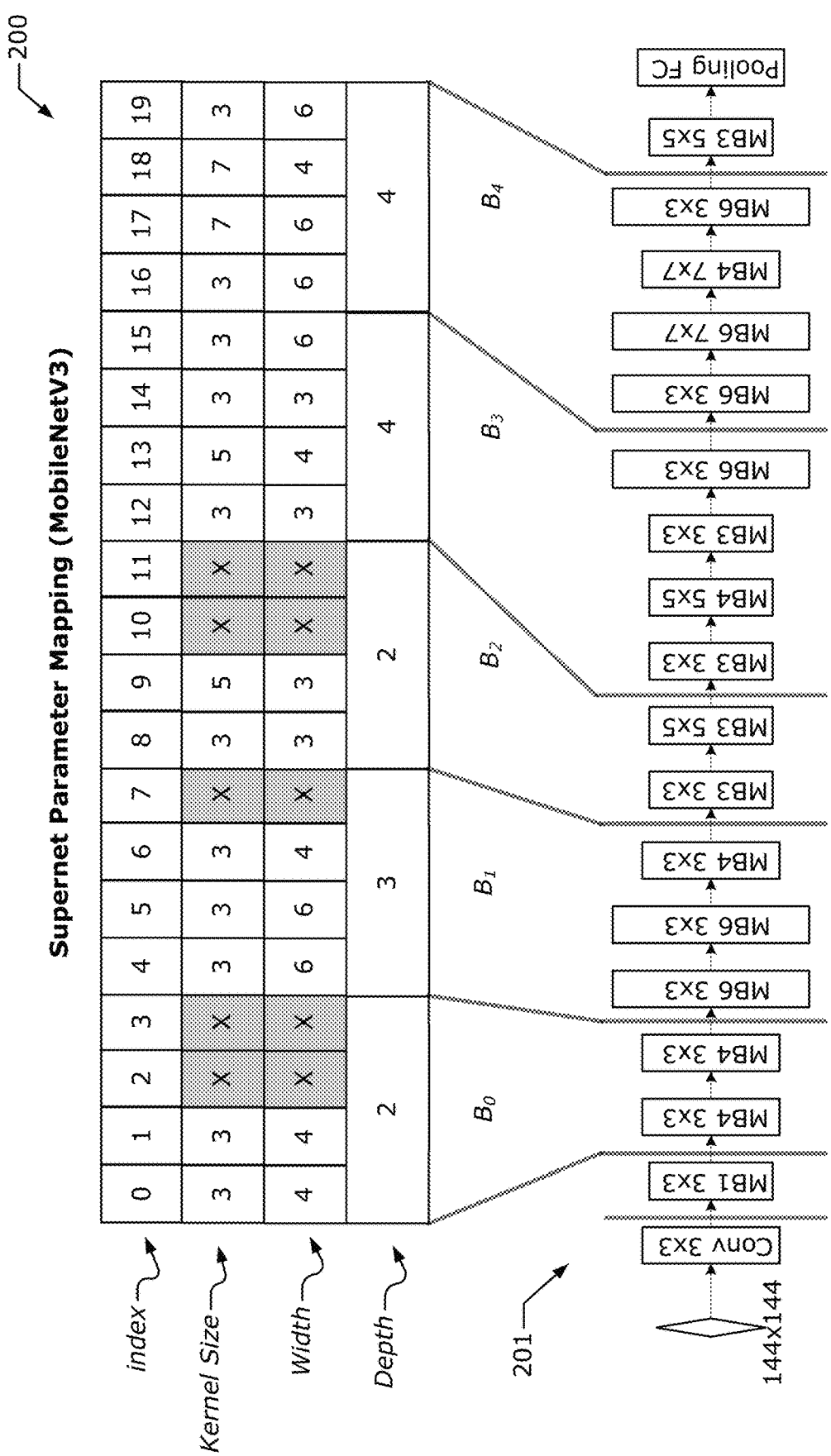
FIG. 2 depicts an example of subnet encoding according to various embodiments.
Figure 3:
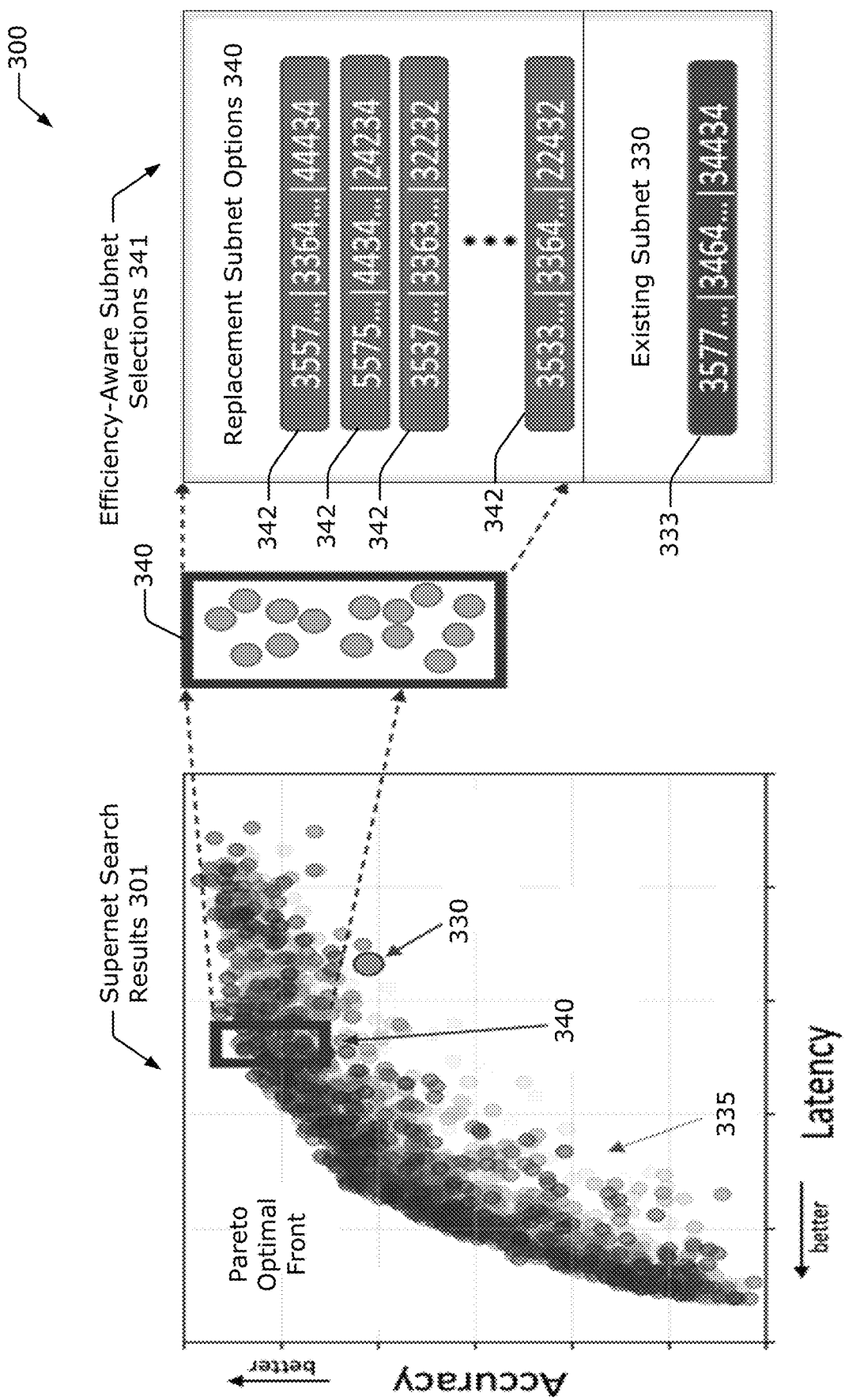
FIG. 3 depicts an example MLMS according to various embodiments.

An energy and communication efficient strategy for selecting and deploying ML models in real-time (or near real time) using a similarity-based subnet selection process is shown and described with respect to FIGS. 2 and 3. In these embodiments, a subnet 135 that has the most overlap in pre-trained parameters from the existing subnet 135 for a target device (e.g., compute node 550). These mechanisms help the target device adapt to a new system states and/or HW conditions/constraints, but also limit the data-transfer resource consumption when writing the new subnet 135 to memory. First, supernets 130 offer a variety of subnet options 147, which is demonstrated by FIG. 2. Furthermore, the energy and communication subnet replacement/swap strategy starts by performing an ML model search (e.g., NAS or the like) on a supernet 130 as show in FIG. 3.

FIG. 2 shows an example of subnet encoding in a supernet weight sharing/parameter mapping framework according to various embodiments. Aspects of weight sharing approaches are discussed in Zhang et al., "Deeper Insights into Weight Sharing in Neural Architecture Search", arXiv: 2001.01431v1 [cs.LG] (6 Jan. 2020) and Li et al., "Geometry-Aware Gradient Algorithms for Neural Architecture Search", arXiv:2004.07802v5 [cs.LG] (18 Mar. 2021), the contents of each of which are hereby incorporated by reference in their entireties. The example of FIG. 2 is based on the MobileNetV3 architecture, which is discussed in [Howard] and [Cai1]. Although FIG. 2 shows a supernet parameter mapping example based on MobileNetV3, many different permutations, data structures, and/or types of supernets 130 and/or subnets 135 can be used in other implementations.

In FIG. 2, a computational graph 201 of a convolutional neural network (CNN) for image classification that comprises various convolutional layers of different block sizes, which is vectorized into vector 200 comprising kernel, expansion ratio (or width), and depth components. The vectorization yields vector 200 that includes forty five elastic parameters as shown by FIG. 2. The computational graph 201 shows various layers, each of which is labeled according to its expansion ratio and kernel size. For example, "MB4 3×3" indicates a mobile block with an expansion ratio of 4 and a kernel size of 3×3.

Each depth component in vector 200 represents a block in the CNN, where the value in each component represents a number of convolutional layers in each block, For example, a first block ($B_0$) includes 2 layers, a second block ($B_1$) includes 3 layers, a third block ($B_2$) includes 2 layers, a fourth block ($B_3$) includes 4 layers, and a fifth block ($B_4$) includes 4 layers. Therefore, the set of values for the depth component of vector 200 includes the values 2, 3, or 4 (e.g., indicated by "Depth={2,3,4}" in FIG. 2). Each kernel size component indicates a kernel size of each layer. For example, a first layer in the first block (index 0) has a kernel size of 3, a second layer in the third block (index 9) has a kernel size of 5, a third layer in the fifth block (index 18) has a kernel size of 7, and so forth. Therefore, the set of values for the kernel size of vector 200 includes the values 3, 5, or 7 (e.g., indicated by "Kernel Size={3,5,7}" in FIG. 2). Additionally, each expansion ratio (width) component indicates an expansion ratio of each layer. For example, a first layer in the first block (index 0) has an expansion ratio (width) of 4, a second layer in the third block (index 9) has an expansion ratio (width) of 3, a fourth layer in the fifth block (index 18) has an expansion ratio (width) of 6, and so forth. Therefore, the set of values for the expansion ratio component of vector 200 includes the values 3, 4, or 6 (e.g., indicated by "Expansion Ratio (Width)={3,4,6}" in FIG. 2). In the example subnet configuration of FIG. 2, unused parameters (e.g., indicated by the value "X" in FIG. 2) are obtained when there are less than the maximum of 4 layers (e.g., 2 or 3 layers) in a block. These unused parameters do not significantly contribute to the prediction or inference determination and may be removed to reduce the overall size of the ML model.

As can be seen from vector 200, each model parameter type (e.g., kernel, width, and depth) has three options leading to $10^{19}$ possible subnet 135 combinations. According to various embodiments, the subnet selector 141 performs subnet swaps that are energy efficient by identifying parameters that are the same as those in the current subnet 135. Here, the subnet selector 141 may determine a replacement subnet 135 to replace the current subnet 135 represented by the vector 200, convert the replacement subnet 135 into a vector, and only change values in the current vector 200 that are different than those in the vectorized replacement subnet 135. For example, if the vectorized replacement subnet 135 has a value of 5 at index 0 in the kernel model parameter, then the subnet selector 141 may replace the current value (e.g., "3") with the new value "5" at index 0 in the kernel model parameter. However, if the vectorized replacement subnet 135 has a value of 3 at index 0 in the kernel model parameter, then the subnet selector 141 may not change the current value (e.g., "3") at index 0 in the kernel model parameter. In these ways, the subnet selector 141 does not have to replace or find a different address to write the new value to, which keeps dynamic write power to a minimum.

FIG. 3 shows an example of the efficiency-aware subnet model selection after the subnet search is performed, according to various embodiments. The supernet search results 301 shows all discovered subnets 335 found during a subnet search, which includes the existing supernet 330 and a set of candidate replacement subnets 340 (individual subnets in the set of candidate replacement subnets 340 may be referred to herein as "replacement subnets 340", "candidate subnets 340", or the like). Here, the discovered subnets 335 are in the form of Pareto front (or Pareto frontier) that includes a set of ML models/subnets 340 that are Pareto efficient solutions. The efficiency-aware subnet selections 341 include vectorized subnet configurations 342 (see e.g., FIG. 2), which are vectorized versions of the subnets from the set of candidate replacement subnets 340. These subnets can be vectorized according to one or more supernet parameters. Additionally, a vectorized version of the supernet 330 (vectorized supernet 333) is also shown in comparison with the vectorized subnet configurations 342.

In embodiments, the subnet selector 141 implements a search function and/or NAS algorithm to identify as many possible subnet candidates 340 for the new context information (e.g., new HW configuration) that precipitated the search. For example, if the processor core count availability changed, and now the existing subnet 135 is not as optimal, the new search may focus on a latency regime that satisfies an objective threshold as defined by the system inputs (or ML config). Of the possible subnet candidates 340 that are found, preference is given to a subnet 340 in the set of candidates 340 that is the most related to the existing subnet 135. The determination of the most closely related subnet 340 is based on the supernet type weight/parameter sharing scheme, such as the vectorization scheme discussed previously with respect to FIG. 2, which can be used to calculate the total transfer cost for each of the candidates 340. The subnet 340 with a minimal total transfer cost (e.g., with respect to the other candidate subnets 340) is selected as a new active subnet.

In various implementations, the target HW platform can be resource-limited, and thus, may not be capable of supporting multiple replacement model weights. Also, with various HW limitation scenarios, the demand to support various model types may be prohibitively memory heavy. Under such scenarios, an online replacement strategy may be used to swap the existing models with the new replacement model weights. However, this in turn can increase the data-transfer energy cost. To limit the data-transfer energy, an optimized replacement or swap model by solving a constraint optimization. Table 1 shows an example ML model search and swap strategy algorithm.

TABLE 1

ML MODEL SEARCH AND SWAP ALGORITHM

| | |
|---|---|
| Data: | Deployed model $f_d(\theta_d)$ parameterized by $\theta_d$, performance difference margin $\alpha$, additional constraint $H(\delta)$. |
| Data: | Training and/or Validation data, constraint C for accuracy predictor, prediction iteration T. |
| 1 | $List_{model} \leftarrow$ empty |
| 2 | for $j \leftarrow 0$ to T do |
| 3 | \| $f_j(\theta_j)$ = AccPredictor(C) |
| 4 | \| $n_j$ = Eval($f_j(\theta_j)$) |
| 5 | \| $n_d$ = Eval($f_d(\theta_d)$) |
| 6 | \| if $|n_j - n_d| \leq \alpha$ and $(f_d - f_j) \leq H(\delta)$ then |
| 7 | \| \| AddModel($f_j$, $List_{model}$) |
| 8 | \| end |
| 9 | end |
| 10 | $M \leftarrow$ Count ($List_{model}$) |
| 11 | init(Min) |
| 12 | for $i \leftarrow 0$ to M do |
| 13 | \| $p_i \leftarrow$ ComputeTransferCost($f_i$, $f_d$) |
| 14 | \| if $p_i \leq$ Min then |
| 15 | \| \| $f_{send} \leftarrow f_i$ |
| 16 | \| end |
| 17 | end |
| 18 | return $f_{send}$ |

The ML model search and swap algorithm attempts to find a nearest possible match in terms of a replacement subnet 340 that will cause a minimum amount of data transfer energy consumption in comparison to other candidate subnets 340. For this scenario, it may be assumed that the subnet 135 that is currently deployed to the HW platform ("deployed subnet $f_d$") is known. The ML model search and swap strategy algorithm has two stages, including stage 1 (lines 2 to 9) which is a candidate replacement model search, and stage 2 (lines 12 to 17) which is a selection function model for a candidate replacement model.

In stage 1 (lines 2 to 9), the subnet selector 141 discovers a set of candidate subnets 340 that have similar performance characteristics, are configured to solve the same or similar AI/ML tasks (or are within a same AI/ML domain), and satisfy a similar system constraint C as the deployed subnet $f_d$. The constraint C is a constraint of the HW platform as when the deployed subnet $f_d$ was deployed to the HW platform. Here, the constraint C may represent a specific system context 105 (e.g., a combination of the various context information 105) of the HW platform when the deployed subnet $f_d$ was deployed (or a system context 105 for which the deployed subnet $f_d$ is optimized).

When the constraint C is met, then at line 6 the subnet selector 141 determines the performance of individual candidate subnets 340 ("replacement subnet $f_j$") and the performance of the deployed subnet $f_d$. At line 6, if a difference between the performance of the deployed subnet $f_d$ and the performance of the potential replacement subnet $f_j$ is within a certain alpha boundary (performance difference margin a), then that replacement subnet $f_j$ is deemed to be a suitable replacement subnet $f_j$ for the deployed subnet $f_d$. This is done by the first argument in line 6 (e.g., "$|n_j - n_d| \leq \alpha$").

A second argument of line 6 (e.g., "$(f_d - f_j) \leq H(\delta)$") determines whether the potential replacement subnet $f_j$ satisfies an additional constraint $H(\delta)$, which may represent the changed system context 105. In other words, the first argument of line 6 checks whether the potential replacement subnet $f_j$ performs similar to the deployed subnet $f_d$, and the second argument checks whether the potential replacement subnet $f_j$ satisfies the added constraint $H(\delta)$ imposed by some change in the underlying HW platform. When the potential replacement subnet $f_j$ satisfies both conditions/arguments, then the potential replacement subnet $f_j$ is added to the set of candidate subnets 340 ("List$_{model}$"). The List$_{model}$ contains all the models that satisfies the accuracy and both the deployment constraint C (e.g., FLOPs) and additional constraint H(δ) that can arise due to the dynamic change in the system state/conditions (e.g., battery status, temperature, etc.). When the set of candidate subnets 340 is decided, the subnet selector 141 proceeds to stage 2.

In stage 2 (lines 12 to 17), the subnet selector 141 chooses an optimal replacement subnet $f_j$ out of all the candidate subnets 340 in the set of candidate subnets 340 primarily based on the data transfer cost of the candidate subnets 340. The subnet selector 141 determines at lines 12 to 17 which potential replacement subnet $f_j$ in the set of candidate subnets 340 should be swapped (provisioned) to the target HW device. In particular, the subnet selector 141 evaluates the transfer cost of individual candidate subnets $f_j$ when being swapped in for the deployed subnet $f_d$. The potential replacement subnet $f_j$ having the smallest data transfer cost $f_{send}$ is eventually returned by the from the ML model search and swap algorithm and deployed to the target HW platform.

1.4. Performance Metrics

The performance metrics that may be measured by the MLMS engine 140 and/or the subnet selector 141 may be based on the particular AI/ML task(s) and/or one or more other inputs/parameters of the ML config. The performance metrics may include model-based metrics and platform-based metrics. The model-based metrics are metrics related to the performance of the model itself and/or without considering the underlying HW platform. The platform-based metrics are metrics related to the performance of the underlying HW platform when operating the ML model.

The model-based metrics may be based on the particular type of AI/ML model and/or the AI/ML domain. For example, regression-related metrics may be predicted for regression-based ML models. Examples of regression-related metrics include error value, mean error, mean absolute error (MAE), mean reciprocal rank (MRR), mean squared error (MSE), root MSE (RMSE), correlation coefficient (R), coefficient of determination ($R^2$), Golbraikh and Tropsha criterion, and/or other like regression-related metrics such as those discussed in Naser et al., "Insights into Performance Fitness and Error Metrics for Machine Learning", arXiv: 2006.00887v1 (17 May 2020) ("[Naser]"), which is hereby incorporated by reference in its entirety.

In another example, correlation-related metrics may be predicted for correlation-related metrics. Examples of correlation-related metrics include accuracy, precision (also referred to as positive predictive value (PPV)), mean average precision (mAP), negative predictive value (NPV), recall (also referred to as true positive rate (TPR) or sensitivity), specificity (also referred to as true negative rate (TNR) or selectivity), false positive rate, false negative rate, F score (e.g., $F_1$ score, $F_2$ score, $F_\beta$ score, etc.), Matthews Correlation Coefficient (MCC), markedness, receiver operating characteristic (ROC), area under the ROC curve (AUC), distance score, and/or other like correlation-related metrics such as those discussed in [Naser].

Additional or alternative model-based metrics may also be predicted such as, for example, cumulative gain (CG), discounted CG (DCG), normalized DCG (NDCG), signal-to-noise ratio (SNR), peak SNR (PSNR), structural similarity (SSIM), Intersection over Union (IoU), perplexity, bilingual evaluation understudy (BLEU) score, inception score, Wasserstein metric, Fréchet inception distance (FID), string metric, edit distance, Levenshtein distance, Damerau-Levenshtein distance, number of evaluation instances (e.g., iterations, epochs, or episodes), learning rate (e.g., the speed at which the algorithm reaches (converges to) optimal weights), learning rate decay (or weight decay), number and/or type of computations, number and/or type of multiply and accumulates (MACs), number and/or type of multiply adds (MAdds) operations and/or other like performance metrics related to the performance of the ML model.

Examples of the platform-based metrics include latency, response time, throughput (e.g., rate of processing work of a processor or platform/system), availability and/or reliability, power consumption (e.g., performance per Watt, etc.), transistor count, execution time (e.g., amount of time to obtain a prediction, inference, etc.), memory footprint, memory utilization, processor utilization, processor time, number of computations, instructions per second (IPS), floating point operations per second (FLOPS), and/or other like performance metrics related to the performance of the ML model and/or the underlying HW platform to be used to operate the ML model.

Additionally or alternatively, proxy metrics (e.g., a metric or attribute used as a stand-in or substitute for another metric or attribute) can be used for predicting the ML model performance. For any of the aforementioned performance metrics, the total, mean, and/or some other distribution of such metrics may be predicted and/or measured using any suitable data collection and/or measurement mechanism(s).

1.5. Example Use Cases

The MLMS system 100 may be used for various scenarios such as unpredictable in-field scenarios when real-time AI/ML application tasks need to be executed with by a HW platform with changing system states/contexts such as the computation and/or storage abilities (e.g., autonomous vehicles, IoT devices, edge computing platforms, and the like).

Another use case involves systems deployed in-field that do not have a continuous connection to a cloud or edge management system. In this example, a sensor array that is deployed in a remote location with only a battery and/or solar power source and the MLMS system 100 may be part of the cloud or edge management system that manages various aspects of the sensor array. The sensor array is able to leverage the energy efficient aspect of the MLMS system 100 as it adapts the ML model for different power modes (e.g. low-power mode at night or the like) or HW faults that resulted in losses to computation bandwidth (e.g., loss of one or more processor cores).

Another use case involves a remotely operated drone that has a majority of its power/energy stored in batteries that are required to keep the drone operational, and the drone needs to conserve its power/energy budget as efficiently as possible. In this example implementation, the MLMS engine 140 may be operated as a subsystem of the drone. In this use case, when the battery runs low or there is no need for high precision inference/predictions, the MLMS system 100 can scale down the drone's ML model to allow for additional energy savings, thereby extending the drone's operational time before a battery recharge is needed.

Another use case includes an IoT device with an image capture device (e.g., a visible light camera or a non-visible light camera) that operates an object recognition ML model. In this example implementation, the MLMS engine 140 may be part of a cloud computing service or an edge computing network communicatively coupled with the IoT device. Here, the MLMS engine 140 provisions (e.g., swaps in/out) different subnets to the IoT device based on feedback obtained from the IoT device. In one example of this use case, the IoT device may be provisioned with a first subnet that is optimized to operate in high visibility environments (e.g., high levels of sunlight), and when the IoT device detects low visibility conditions (e.g., night, rain, fog, etc.), an indication of the low visibility conditions is sent to the MLMS engine 140, and the MLMS engine 140 provisions the IoT device with a second subnet that is optimized for detecting objects in low visibility conditions. In this example, different subnets may be optimized for different conditions, for example, one subnet may be optimized for object detection in night time conditions, while another subnet may be optimized for object detection in rainy conditions, and yet another subnet may be optimized for object detection in foggy conditions.

Another use case includes an edge compute node that operates a distributed learning and/or federated ML model, where the edge compute node distributes learning tasks to different client devices 101 and/or network access nodes (NANs) (see e.g., Int'l Pub. No. 2021/158313 filed on 26 Dec. 2020, the contents of which are hereby incorporated by reference in its entirety). In this example implementation, the MLMS system 100 may be an edge application(s) and/or service(s) operated by the edge compute node. Additionally or alternatively, the MLMS engine 140 and the performance auditor 125 may be part of the same edge application (app) and/or service, or may be separate edge apps/services configured to interact with one another via one or more suitable edge APIs. In this example use case, the MLMS engine 140 provisions (e.g., swaps in/out) different subnets 135 of a federated ML model 130 based on feedback obtained from the various client devices 101. The feedback may be based on the ability (or inability) of client devices 101 to calculate or otherwise complete learning tasks (e.g., gradients, etc.) in a current or next training round, epoch, episode, etc.; one or more signal strength and/or quality measurements (e.g., obtained from the client devices 101, network elements, and/or core network functions); data/measurements about current or future environmental conditions (e.g., obtained from the client devices 101, network elements, core network functions, app servers, cloud services, etc.); and/or other like measurements and/or data.

2. Artificial Intelligence and Machine Learning Aspects

Machine learning (ML) involves programming computing systems to optimize a performance criterion using example (training) data and/or past experience. ML refers to the use and development of computer systems that are able to learn and adapt without following explicit instructions, by using algorithms and/or statistical models to analyze and draw inferences from patterns in data. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions).

ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm" refers to different concepts than the term "ML model," these terms may be used interchangeably for the purposes of the present disclosure. Any of the ML techniques discussed herein may be utilized, in whole or in part, and variants and/or combinations thereof, for any of the example embodiments discussed herein.

ML may require, among other things, obtaining and cleaning a dataset, performing feature selection, selecting an ML algorithm, dividing the dataset into training data and testing data, training a model (e.g., using the selected ML algorithm), testing the model, optimizing or tuning the model, and determining metrics for the model. Some of these tasks may be optional or omitted depending on the use case and/or the implementation used.

ML algorithms accept model parameters (or simply "parameters") and/or hyperparameters that can be used to control certain properties of the training process and the resulting model. Model parameters are parameters, values, characteristics, configuration variables, and/or properties that are learnt during training. Model parameters are usually required by a model when making predictions, and their values define the skill of the model on a particular problem. Hyperparameters at least in some embodiments are characteristics, properties, and/or parameters for an ML process that cannot be learnt during a training process. Hyperparameter are usually set before training takes place, and may be used in processes to help estimate model parameters.

ML techniques generally fall into the following main types of learning problem categories: supervised learning, unsupervised learning, and reinforcement learning. Supervised learning involves building models from a set of data that contains both the inputs and the desired outputs. Unsupervised learning is an ML task that aims to learn a function to describe a hidden structure from unlabeled data. Unsupervised learning involves building models from a set of data that contains only inputs and no desired output labels. Reinforcement learning (RL) is a goal-oriented learning technique where an RL agent aims to optimize a long-term objective by interacting with an environment. Some implementations of AI and ML use data and neural networks (NNs) in a way that mimics the working of a biological brain. An example of such an implementation is shown by FIG. 4.

Figure 4:
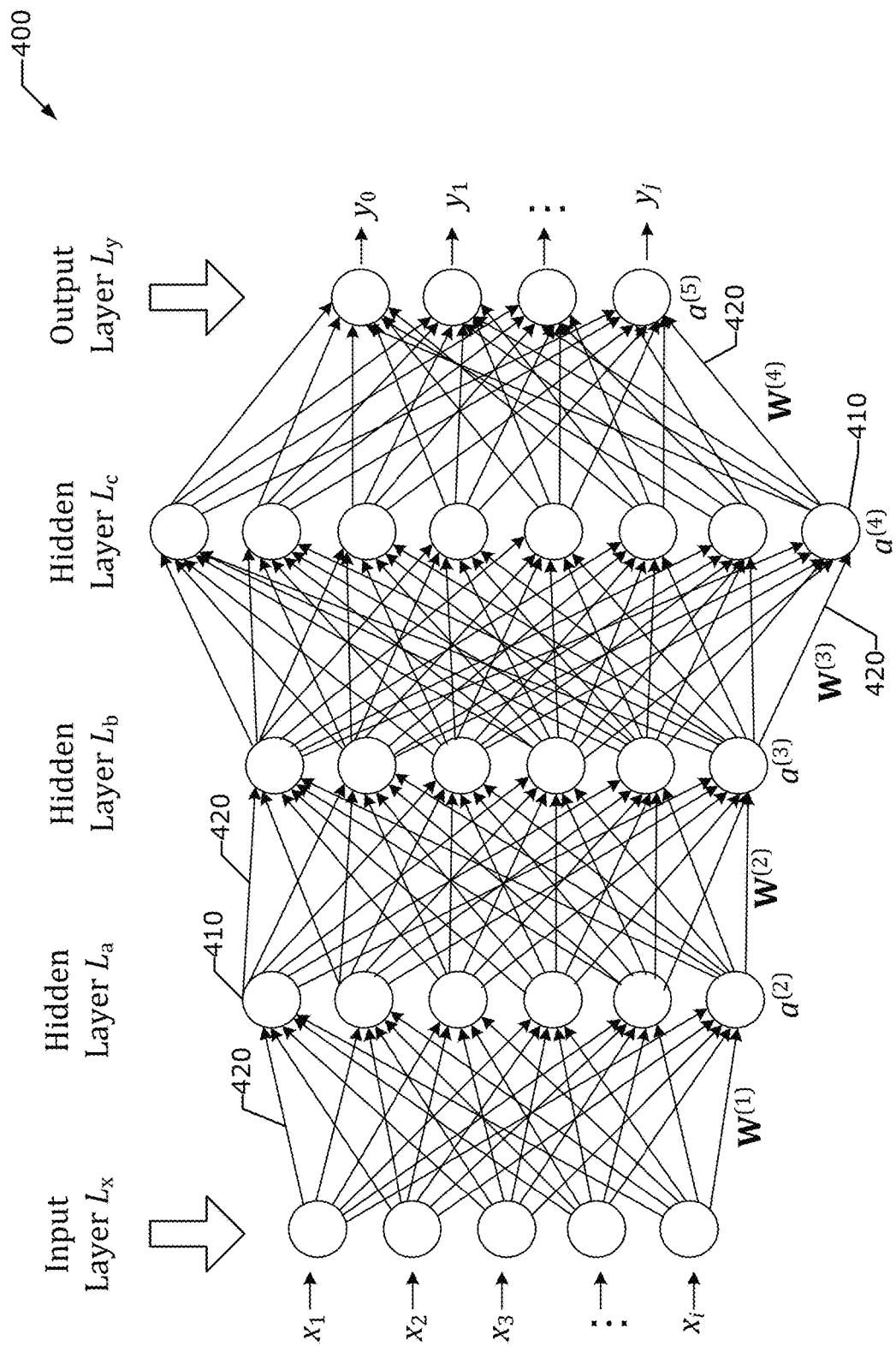
FIG. 4 depicts an example neural network (NN).

FIG. 4 illustrates an example NN 400, which may be suitable for use by one or more of the computing systems (or subsystems) of the various implementations discussed herein, implemented in part by a HW accelerator, and/or the like. The NN 400 may be deep neural network (DNN) used as an artificial brain of a compute node or network of compute nodes to handle very large and complicated observation spaces. Additionally or alternatively, the NN 400 can be some other type of topology (or combination of topologies), such as a convolution NN (CNN), deep CNN (DCN), recurrent NN (RNN), Long Short Term Memory (LSTM) network, a Deconvolutional NN (DNN), gated recurrent unit (GRU), deep belief NN, a feed forward NN (FFN), a deep FNN (DFF), deep stacking network, Markov chain, perception NN, Bayesian Network (BN) or Bayesian NN (BNN), Dynamic BN (DBN), Linear Dynamical System (LDS), Switching LDS (SLDS), Optical NNs (ONNs), an NN for reinforcement learning (RL) and/or deep RL (DRL), and/or the like. NNs are usually used for supervised learning, but can be used for unsupervised learning and/or RL.

The NN 400 may encompass a variety of ML techniques where a collection of connected artificial neurons 410 that (loosely) model neurons in a biological brain that transmit signals to other neurons/nodes 410. The neurons 410 may also be referred to as nodes 410, processing elements (PEs) 410, or the like. The connections 420 (or edges 420) between the nodes 410 are (loosely) modeled on synapses of a biological brain and convey the signals between nodes 410. Note that not all neurons 410 and edges 420 are labeled in FIG. 4 for the sake of clarity.

Each neuron 410 has one or more inputs and produces an output, which can be sent to one or more other neurons 410 (the inputs and outputs may be referred to as "signals"). Inputs to the neurons 410 of the input layer $L_x$ can be feature values of a sample of external data (e.g., input variables $x_i$). The input variables $x_i$ can be set as a vector containing relevant data (e.g., observations, ML features, etc.). The inputs to hidden units 410 of the hidden layers $L_a$, $L_b$, and $L_c$ may be based on the outputs of other neurons 410. The outputs of the final output neurons 410 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 410 may have a threshold such that a signal is sent only if the aggregate signal crosses that threshold. A node 410 may include an activation function, which defines the output of that node 410 given an input or set of inputs. Additionally or alternatively, a node 410 may include a propagation function that computes the input to a neuron 410 from the outputs of its predecessor neurons 410 and their connections 420 as a weighted sum. A bias term can also be added to the result of the propagation function.

The NN 400 also includes connections 420, some of which provide the output of at least one neuron 410 as an input to at least another neuron 410. Each connection 420 may be assigned a weight that represents its relative importance. The weights may also be adjusted as learning proceeds. The weight increases or decreases the strength of the signal at a connection 420.

The neurons 410 can be aggregated or grouped into one or more layers L where different layers L may perform different transformations on their inputs. In FIG. 4, the NN 400 comprises an input layer $L_x$, one or more hidden layers $L_a$, $L_b$, and $L_c$, and an output layer $L_y$ (where a, b, c, x, and y may be numbers),where each layer L comprises one or more neurons 410. Signals travel from the first layer (e.g., the input layer $L_1$), to the last layer (e.g., the output layer $L_y$), possibly after traversing the hidden layers $L_a$, $L_b$, and $L_c$ multiple times. In FIG. 4, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables $y_j$ (where j=1, . . . , p', where p' is a number that is the same or different than p). In the example of FIG. 4, for simplicity of illustration, there are only three hidden layers $L_a$, $L_b$, and $L_c$ in the ANN 400, however, the ANN 400 may include many more (or fewer) hidden layers $L_a$, $L_b$, and $L_c$ than are shown.

3. Example Hardware and Software Configurations and Arrangements

Figure 5A:
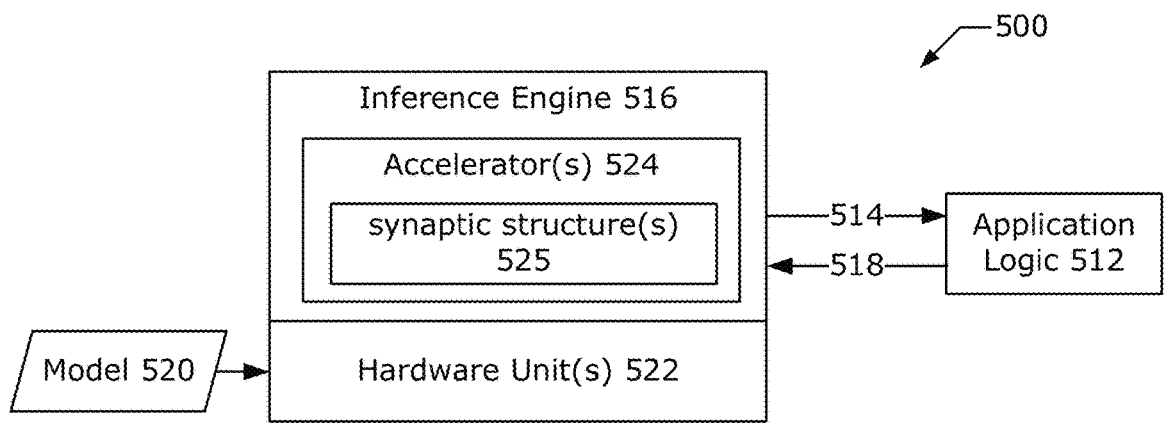
FIG. 5a illustrates an example accelerator architecture.

FIG. 5a is an example accelerator architecture 500 for according to various embodiments. The accelerator architecture 500 provides neural network (NN) functionality to application logic 512, and as such, may be referred to as a NN accelerator architecture 500, DNN accelerator architecture 500, and/or the like.

The application logic 512 may include application SW and/or HW components used to perform specification functions. The application logic 512 forwards data 514 to an inference engine 516. The inference engine 516 is a runtime element that delivers a unified application programming interface (API) that integrates a ANN (e.g., DNN(s) or the like) inference with the application logic 512 to provide a result 518 (or output) to the application logic 512.

To provide the inference, the inference engine 516 uses a model 520 that controls how the DNN inference is made on the data 514 to generate the result 518. Specifically, the model 520 includes a topology of layers of a NN. The topology includes an input layer that receives the data 514, an output layer that outputs the result 518, and one or more hidden layers between the input and output layers that provide processing between the data 14 and the result 518. The topology may be stored in a suitable information object, such as an extensible markup language (XML), JavaScript Object Notation (JSON), and/or other suitable data structure, file, and/or the like. The model 520 may also include weights and/or biases for results for any of the layers while processing the data 514 in the inference using the DNN.

The inference engine 516 may be implemented using and/or connected to HW unit(s) 522. The inference engine 516 at least in some embodiments is an element that applies logical rules to a knowledge base to deduce new information. The knowledge base at least in some embodiments is any technology used to store complex structured and/or unstructured information used by a computing system (e.g., compute node 550 of FIG. 5). The knowledge base may include storage devices, repositories, database management systems, and/or other like elements.

Furthermore, the inference engine 516 includes one or more accelerators 524 that provide HW acceleration for the DNN inference using one or more HW units 522. The accelerator(s) 524 are SW and/or HW element(s) specifically tailored/designed as HW acceleration for AWL applications and/or AI/ML tasks. The one or more accelerators 524 may include one or more processing element (PE) arrays and/or a multiply-and-accumulate (MAC) architecture in the form of a plurality of synaptic structures 525. The accelerator(s) 524 may correspond to the acceleration circuitry 564 of FIG. 5 described infra.

The HW unit(s) 522 may include one or more processors and/or one or more programmable devices. As examples, the processors may include central processing units (CPUs), graphics processing units (GPUs), dedicated AI accelerator Application Specific Integrated Circuits (ASICs), vision processing units (VPUs), tensor processing units (TPUs) and/or Edge TPUs, Neural Compute Engine (NCE), Pixel Visual Core (PVC), photonic integrated circuit (PIC) or optical/photonic computing device, and/or the like. The programmable devices may include, for example, logic arrays, programmable logic devices (PLDs) such as complex PLDs (CPLDs), field-programmable gate arrays (FPGAs), programmable ASICs, programmable System-on-Chip (SoC), and the like. The processor(s) and/or programmable devices may correspond to processor circuitry 552 and/or acceleration circuitry 564 of FIG. 5.

Figure 5B:
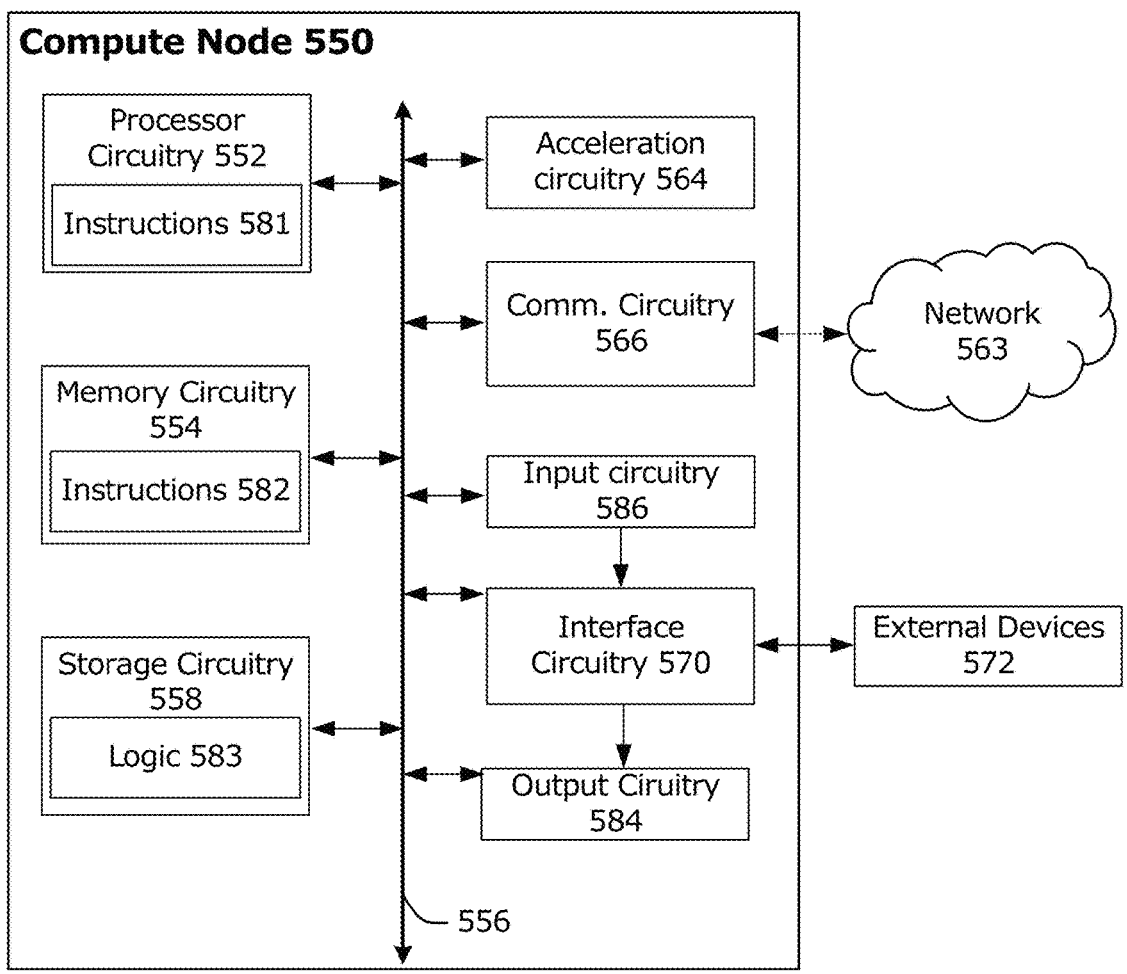
FIG. 5b illustrates an example components of a computing system.

FIG. 5b illustrates an example of components that may be present in a compute node 550 for implementing the techniques (e.g., operations, processes, methods, and methodologies) described herein. FIG. 5b provides a view of the components of node 550 when implemented as part of a computing device (e.g., as a mobile device, a base station, server computer, gateway, appliance, etc.). In some implementations, the compute node 550 may be an HW platform on which an ML model is deployed, which may be replaced by a replacement ML model according to the various embodiments discussed herein. In some implementations, the compute node 550 may be the client device 101. In some implementations, the compute node 550 may be an application server, edge server, cloud compute node, or other like device/system configured to operate the MLMS system 100 (or portions thereof). In one example, the compute node 550 may be an application server that operates the MLMSI 110b, and another compute node 550 may be an edge, a cloud compute node, or some other type of node that operates the MLAS engine 140 and the performance auditor 125. In another example, the compute node 550 may be an application server that operates the MLMSI 110b, another compute node 550 may be an edge or cloud compute node that operates the MLAS engine 140, and yet another compute node 550 may be an edge or cloud compute node that operates the performance auditor 125. Additionally or alternatively, the compute node 550 may be an application server, edge server, cloud compute node, or the like that operates some or all of the process 600 discussed previously. The compute node 550 may include any combinations of the HW or logical components referenced herein, and it may include or couple with any device usable with an edge communication network or a combination of such networks. The components may be implemented as ICs, portions thereof, discrete electronic devices, or other modules, instruction sets, programmable logic or algorithms, HW, HW accelerators, software (SW), firmware, or a combination thereof adapted in the compute node 550, or as components otherwise incorporated within a chassis of a larger system. For one embodiment, at least one processor 552 may be packaged together with computational logic 582 and configured to practice aspects of various example embodiments described herein to form a System in Package (SiP) or a System on Chip (SoC).

The node 550 includes processor circuitry in the form of one or more processors 552. The processor circuitry 552 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 552 may include one or more HW accelerators (e.g., same or similar to acceleration circuitry 564), which may be microprocessors, programmable processing devices (e.g., FPGA, ASIC, etc.), or the like. The one or more accelerators may include, for example, computer vision and/or deep learning accelerators. In some implementations, the processor circuitry 552 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 552 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 552 may be coupled with or may include memory/storage and may be configured to execute instructions 581 stored in the memory/storage to enable various applications or operating systems to run on the platform 550. The processors (or cores) 552 is configured to operate application SW to provide a specific service to a user of the platform 550. In some embodiments, the processor(s) 552 may be a special-purpose processor(s)/controller(s) configured (or configurable) to operate according to the various embodiments herein.

As examples, the processor(s) 552 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 552 may be a part of a system on a chip (SoC), System-in-Package (SiP), a multi-chip package (MCP), and/or the like, in which the processor(s) 552 and other components are formed into a single integrated circuit, or a single package, such as the Edison™ or Galileo™ SoC boards from Intel® Corporation. Other examples of the processor(s) 552 are mentioned elsewhere in the present disclosure.

The node 550 may include or be coupled to acceleration circuitry 564, which may be embodied by one or more AI/ML accelerators, a neural compute stick, neuromorphic HW, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 564 may comprise logic blocks or logic fabric and other interconnected resources that may be programmed (configured) to perform various functions, such as the procedures, methods, functions, etc. of the various embodiments discussed herein. In such implementations, the acceleration circuitry 564 may also include memory cells (e.g., EPROM, EEPROM, flash memory, static memory (e.g., SRAM, antifuses, etc.) used to store logic blocks, logic fabric, data, etc. in LUTs and the like.

In some implementations, the processor circuitry 552 and/or acceleration circuitry 564 may include HW elements specifically tailored for machine learning functionality, such as for operating performing ANN operations such as those discussed herein. In these implementations, the processor circuitry 552 and/or acceleration circuitry 564 may be, or may include, an AI engine chip that can run many different kinds of AI instruction sets once loaded with the appropriate weightings and training code. Additionally or alternatively, the processor circuitry 552 and/or acceleration circuitry 564 may be, or may include, AI accelerator(s), which may be one or more of the aforementioned HW accelerators designed for HW acceleration of AI applications. As examples, these processor(s) or accelerators may be a cluster of artificial intelligence (AI) GPUs, tensor processing units (TPUs) developed by Google® Inc., Real AI Processors (RAPs™) provided by AlphaIcs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, HW 3 provided by Tesla®, Inc., an Epiphany™ based processor provided by Adapteva®, or the like. In some embodiments, the processor circuitry 552 and/or acceleration circuitry 564 and/or HW accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the Hi Silicon Kirin 970 provided by Huawei®, and/or the like. In some HW-based implementations, individual subsystems of node 550 may be operated by the respective AI accelerating co-processor(s), AI GPUs, TPUs, or HW accelerators (e.g., FPGAs, ASICs, DSPs, SoCs, etc.), etc., that are configured with appropriate logic blocks, bit stream(s), etc. to perform their respective functions.

The node 550 also includes system memory 554. Any number of memory devices may be used to provide for a given amount of system memory. As examples, the memory 554 may be, or include, volatile memory such as random access memory (RAM), static RAM (SRAM), dynamic RAM (DRAM), synchronous DRAM (SDRAM), RAMBUS® Dynamic Random Access Memory (RDRAM®), and/or any other desired type of volatile memory device. Additionally or alternatively, the memory 554 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 554 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 558 provides persistent storage of information such as data, applications, operating systems and so forth. In an example, the storage 558 may be implemented via a solid-state disk drive (SSDD) and/or high-speed electrically erasable memory (commonly referred to as "flash memory"). Other devices that may be used for the storage 558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 554 and/or storage circuitry 558 may also incorporate three-dimensional (3D) cross-point (XPOINT) memories from Intel® and Micron®.

The memory circuitry 554 and/or storage circuitry 558 is/are configured to store computational logic 583 in the form of SW, firmware, microcode, or HW-level instructions to implement the techniques described herein. The computational logic 583 may be employed to store working copies and/or permanent copies of programming instructions, or data to create the programming instructions, for the operation of various components of system 500 (e.g., drivers, libraries, application programming interfaces (APIs), etc.), an operating system of system 500, one or more applications, and/or for carrying out the embodiments discussed herein. The computational logic 583 may be stored or loaded into memory circuitry 554 as instructions 582, or data to create the instructions 582, which are then accessed for execution by the processor circuitry 552 to carry out the functions described herein. The processor circuitry 552 and/or the acceleration circuitry 564 accesses the memory circuitry 554 and/or the storage circuitry 558 over the IX 556. The instructions 582 direct the processor circuitry 552 to perform a specific sequence or flow of actions, for example, as described with respect to flowchart(s) and block diagram(s) of operations and functionality depicted previously. The various elements may be implemented by assembler instructions supported by processor circuitry 552 or high-level languages that may be compiled into instructions 581, or data to create the instructions 581, to be executed by the processor circuitry 552. The permanent copy of the programming instructions may be placed into persistent storage devices of storage circuitry 558 in the factory or in the field through, for example, a distribution medium (not shown), through a communication interface (e.g., from a distribution server (not shown)), over-the-air (OTA), or any combination thereof.

The IX 556 couples the processor 552 to communication circuitry 566 for communications with other devices, such as a remote server (not shown) and the like. The communication circuitry 566 is a HW element, or collection of HW elements, used to communicate over one or more networks 563 and/or with other devices. In one example, communication circuitry 566 is, or includes, transceiver circuitry configured to enable wireless communications using any number of frequencies and protocols such as, for example, the Institute of Electrical and Electronics Engineers (IEEE) 802.11 (and/or variants thereof), IEEE 802.15.4, Bluetooth® and/or Bluetooth® low energy (BLE), ZigBee®, LoRaWAN™ (Long Range Wide Area Network), a cellular protocol such as 3GPP LTE and/or Fifth Generation (5G)/ New Radio (NR), and/or the like. Additionally or alternatively, communication circuitry 566 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others. In some embodiments, the communication circuitry 566 may include or otherwise be coupled with the an accelerator 524 including one or more synaptic devices/structures 525, etc., as described previously.

The IX 556 also couples the processor 552 to interface circuitry 570 that is used to connect node 550 with one or more external devices 572. The external devices 572 may include, for example, sensors, actuators, positioning circuitry (e.g., global navigation satellite system (GNSS)/ Global Positioning System (GPS) circuitry), client devices, servers, network elements and/or network appliances (e.g., switches, hubs, routers, etc.), HW accelerator(s) 500, integrated photonics devices (e.g., optical neural network (ONN) integrated circuit (IC) and/or the like), and/or other like devices.

The sensors includes devices, modules, or subsystems whose purpose is to detect events or changes in its environment and send the information (sensor data) about the detected events to some other a device, module, subsystem, etc. Examples of such sensors include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 550); pressure sensors; barometric pressure sensors; gravimeters; altimeters; image capture devices (e.g., cameras); light detection and ranging (LiDAR) sensors; proximity sensors (e.g., infrared radiation detector and the like); depth sensors; ambient light sensors; optical light sensors; ultrasonic transceivers; microphones; and the like.

The actuators, allow the compute node 550 to change its state, position, and/or orientation, or move or control a mechanism or system. The actuators comprise electrical and/or mechanical devices for moving or controlling a mechanism or system, and converts energy (e.g., electric current or moving air and/or liquid) into some kind of motion. The actuators may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The compute node 550 may be configured to operate one or more actuators based on one or more captured events and/or instructions or control signals received from a service provider and/or various client systems.

In some optional examples, various input/output (I/O) devices may be present within or connected to, the node 550, which are referred to as input circuitry 586 and output circuitry 584 in FIG. 5. The input circuitry 586 and output circuitry 584 include one or more user interfaces designed to enable user interaction with the platform 550 and/or peripheral component interfaces designed to enable peripheral component interaction with the platform 550. Input circuitry 586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 584 may be included to show information or otherwise convey information, such as sensor readings, actuator position(s), or other like information. Data and/or graphics may be displayed on one or more user interface components of the output circuitry 584. Output circuitry 584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 550. The output circuitry 584 may also include speakers and/or other audio emitting devices, printer(s), and/or the like. Additionally or alternatively, sensor(s) may be used as the input circuitry 584 (e.g., an image capture device, motion capture device, or the like) and one or more actuators may be used as the output device circuitry 584 (e.g., an actuator to provide haptic feedback or the like). Peripheral component interfaces may include, but are not limited to, a non-volatile memory port, a USB port, an audio jack, a power supply interface, etc. A display or console HW, in the context of the present system, may be used to provide output and receive input of an edge computing system; to manage components or services of an edge computing system; identify a state of an edge computing component or service; or to conduct any other number of management or administration functions or service use cases.

The components of the node 550 may communicate over the interconnect (IX) 556. The IX 556 may include any number of technologies, including Industry Standard Architecture (ISA) and/or extended ISA (EISA), FASTBUS, Low Pin Count (LPC) bus, Inter-Integrated Circuit (I²C), Serial Peripheral Interface (SPI), power management bus (PM-Bus), peripheral component IX (PCI), PCI express (PCIe), PCI extended (PCIx), Intel® QuickPath IX (QPI), Intel®

Ultra Path IX (UPI), Intel® Accelerator Link, Compute Express Link (CXL), Coherent Accelerator Processor Interface (CAPI) and/or OpenCAPI, Intel® Omni-Path Architecture (OPA), RapidIO™, cache coherent interconnect for accelerators (CCIX), Gen-Z Consortium, HyperTransport and/or Lightning Data Transport (LDT), NVLink provided by NVIDIA®, InfiniBand (IB), Time-Trigger Protocol (TTP), FlexRay, PROFIBUS, Ethernet, Universal Serial Bus (USB), point-to-point interfaces, and/or any number of other IX technologies. The IX 556 may be a proprietary bus, for example, used in a SoC based system.

The number, capability, and/or capacity of the elements of the compute node 550 may vary, depending on whether compute node 550 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the compute node 550 may comprise one or more components of a data center such as one or more servers and/or switches (or switch fabric), a desktop computer, a workstation, a laptop, a smartphone, a tablet, a digital camera, a smart appliance, a smart home hub, a network appliance, and/or any other device/system that processes data.

In one example implementation, the compute node 550 may be, or may be part of an appliance computing device that is a self-contained electronic device including a housing, a chassis, a case or a shell. In some circumstances, the housing may be dimensioned for portability such that it can be carried by a human and/or shipped. Additionally or alternatively, the housing may be a smaller module suitable for installation in a vehicle or in an outdoors location (e.g., a utility pole, side of a building, on a tree or rock, and/or the like). Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting HW to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion HW (e.g., wheels, propellers, etc.) and/or articulating HW (e.g., robot arms, pivotable appendages, etc.). In some circumstances, the sensors may include any type of input devices such as user interface HW (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB, Lightning, Ethernet, etc.), etc. In some circumstances, the compute node 550 may be deployed in a network for a specific purpose (e.g., a traffic light, road side unit, surveillance camera, IoT device and/or autonomous sensors, etc.), but may have processing and/or other capacities that may be utilized for other purposes. Such compute nodes 550 may be independent from other networked devices and may be provided with a housing having a form factor suitable for its primary purpose; yet be available for other compute tasks that do not interfere with its primary task. The compute node 550 may include HW and SW components to manage local issues such as device temperature, vibration, resource utilization, updates, power issues, physical and network security, etc. These HW and SW components to manage local issues may be used to adapt an ML model being operated by the compute node 550 according to the various embodiments discussed herein.

In another example implementation, the compute node 550 may be, or may be included in one or more servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other SW, code or scripts may execute while being isolated from one or more other applications, SW, code or scripts.

4. Example Implementations

Figure 6:
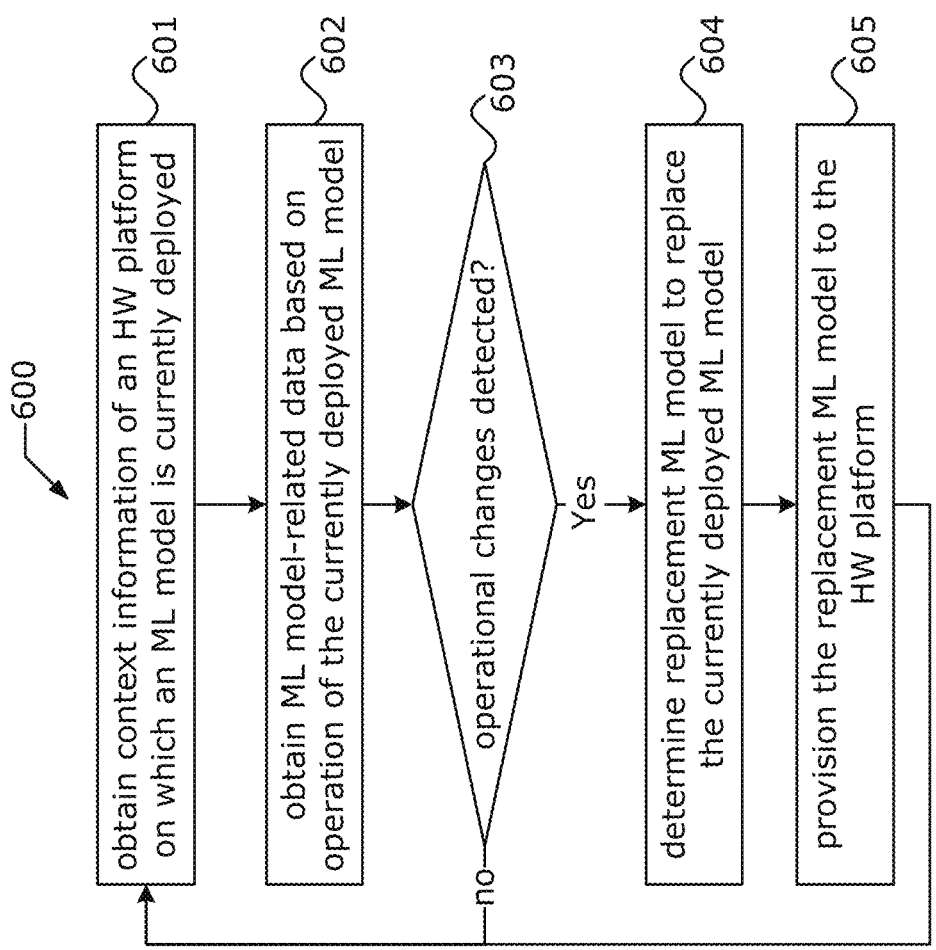
FIG. 6 depict example procedures that may be used to practice the various embodiments discussed herein.

FIG. 6 depicts a process 600 for performing a machine learning model swap (MLMS) strategy. Process 600 may be performed by a compute node that implements the MLMS system 100. Process 600 begins at operation 601 where the compute node obtains context information 105 of an HW platform on which an ML model is currently deployed. The currently deployed ML model may be a supernet 130 or a particular subnet 135 derived from the supernet 130, and the HW platform may be the compute node itself, or another compute node. At operation 602, the compute node obtains ML model-related data based on operation of the currently deployed ML model. The ML model-related data may include inference results 142 generated by the currently deployed ML model and/or quality/performance metrics 143 based on the inference results 142.

At operation 603, the compute node determines whether operational changes of the HW platform have been detected. This determination is based at least in part on the context information 105 and the ML model-related data in comparison with predetermined and/or configured thresholds (e.g., the application quality metrics, system constraints, and performance auditor settings in an ML config). If operational changes of the HW platform are not detected, the compute node loops back to operation 601 to obtain new context information and then new ML model-related data at operation 602. If operational changes of the HW platform are detected, the compute node proceeds to operation 604 to determine or identify a replacement ML model (e.g., another subnet 135) from among a set of candidate ML models 340 to replace the currently deployed ML model. The replacement ML model is optimized for operating on the HW platform with the detected operational changes. The determination/identification of the replacement ML model may be done by executing the ML model search and swap strategy algorithm shown by Table 1 supra. At operation 605, the compute node provisions the determined/identified replacement ML model to the HW platform. After operation

605, the compute node proceeds back to operation 601 to obtain new context information and then new ML model-related data at operation 602.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example A01 includes a method for operating a machine learning model swap (MLMS) system, the method comprising: obtaining context information of a HW platform on which an ML model is currently deployed; detecting a status change of the HW platform based on the context information of the HW platform and based on inference results generated by the currently deployed ML model; and triggering an MLMS engine to perform an MLMS, wherein the MLMS involves replacement of the currently deployed ML model with a replacement ML model, and the replacement ML model is optimized for operating on the HW platform.

Example A02 includes the method of example A01 and/or some other example(s) herein, further comprising: operating the MLMS engine to perform the MLMS.

Example A03 includes the method of example A02 and/or some other example(s) herein, wherein performing the MLMS comprises: operating the MLMS engine to execute a neural architecture search (NAS) algorithm to discover the replacement ML model.

Example A04 includes the method of examples A02-A03 and/or some other example(s) herein, wherein, prior to deployment of the currently deployed ML model, the method further comprising: obtaining a reference ML model; generating a set of ML models by optimization of the reference ML model for each of a plurality of different operational conditions of the HW platform, wherein one or more ML models of the set of ML models has fewer parameters than the reference ML model, and the currently deployed ML model is among the generated set of ML models; and storing the set of ML models, wherein the replacement ML model is among the stored set of ML models.

Example A05 includes the method of example A04 and/or some other example(s) herein, wherein performing the MLMS comprises: discovering a set of candidate ML models among the stored set of ML models that satisfy a first system constraint of the HW platform and a second system constraint of the HW platform, wherein the first system constraint represents a system context of the HW platform when the currently deployed ML model was deployed, and the second system constraint represents a system context of the HW platform based on the detected status change; determining, for each candidate ML model in the set of candidate ML models, a data transfer cost, the data transfer cost being an amount of computational resources needed to replace the currently deployed ML model with a corresponding one of the set of candidate ML models; and selecting, as the replacement ML model, a candidate ML model from the set of candidate ML models having a lowest data transfer cost.

Example A06 includes the method of example A05 and/or some other example(s) herein, wherein determining the data transfer cost comprises: vectorizing the candidate ML models in the set of candidate ML models; and comparing each of the vectorized candidate ML models with a vectorized version of the currently deployed ML model.

Example A07 includes the method of examples A01-A06 and/or some other example(s) herein, further comprising: obtaining an ML configuration, wherein the ML configuration includes thresholds for triggering performance of the MLMS.

Example A08 includes the method of example A07 and/or some other example(s) herein, wherein the thresholds for triggering performance of the MLMS include application quality metrics, wherein the application quality metrics include performance metric thresholds for the currently deployed ML model that, when reached or exceeded, trigger the performance of the MLMS.

Example A09 includes the method of examples A07-A08 and/or some other example(s) herein, wherein the thresholds for triggering performance of the MLMS include system constraints, wherein the system constraints include thresholds for one or more system parameters of the HW platform that, when reached or exceeded, trigger the performance of the MLMS.

Example A10 includes the method of examples A01-A09 and/or some other example(s) herein, wherein the context information includes a current mode of operation of the HW platform, and the current mode of operation of the HW platform includes one of a sleep mode, an idle mode, an awake mode, and a burst.

Example A11 includes the method of examples A01-A10 and/or some other example(s) herein, wherein the context information includes system state information (SSI) of the HW platform, and the SSI includes one or more of temperature of individual HW components of the HW platform, computational capacity, memory utilization, power source state information, operating system information, and a semiconductor process of the individual HW components.

Example A12 includes the method of examples A01-A11 and/or some other example(s) herein, wherein the context information includes physical environment information (PEI) about an environment surrounding the HW platform, and the PEI includes one or more of a current temperature, humidity, moisture, altitude, ambient light, ambient sound volume, and weather data for a location of the HW platform.

Example A13 includes the method of examples A01-A12 and/or some other example(s) herein, wherein the context information includes networking environment information (NEI) of the HW platform, and the NEI includes one or more of channel state conditions, network connectivity metrics, data transfer rates, and network parameters.

Example A14 includes the method of examples A01-A13 and/or some other example(s) herein, wherein the method is performed by a compute node.

Example A15 includes the method of example A14 and/or some other example(s) herein, wherein the compute node is the HW platform or the compute node is a component of the HW platform.

Example A16 includes the method of example A14 and/or some other example(s) herein, wherein the compute node is separate from the HW platform.

Example A17 includes the method of examples A01-A16 and/or some other example(s) herein, wherein the HW platform is one of an Internet of Things (IoT) device, a drone, an autonomous vehicle, a client device, a network appliance, a network element, an edge server, or one or more cloud compute nodes of a cloud computing service.

Example A18 includes the method of examples A01-A17 and/or some other example(s) herein, wherein the HW platform is an edge compute node, the MLMS engine is an edge application or service operated by the edge compute node, and the method further comprises: operating a federated ML model to: distribute respective learning tasks to a set of devices in a communications network, the set of devices including one or more client devices or one or more network access nodes, and obtain feedback from the set of devices, the feedback including completed ones of the respective learning tasks and at least a portion of the context information, wherein the portion of the context information includes one or more of an indication of an ability or inability of client devices to complete the respective learning tasks, one or more signal quality measurements, and environmental condition measurements or data; and operating the MLMS engine to determine the replacement ML model to be an optimized version of the federated ML model based on the feedback.

Example B01 includes a method of operating a compute node to implement a machine learning model swap (MLMS) strategy, the method comprising: obtaining context information of an HW platform on which an ML model is currently deployed; obtaining inference results generated by the currently deployed ML model; detecting operational changes of the HW platform based on the context information and the inference results; determining, in response to the detected operational changes, a replacement ML model to replace the currently deployed ML model, wherein the replacement ML model is optimized for operating on the HW platform with the detected operational changes; and provisioning the determined replacement ML model to the HW platform.

Example B02 includes the method of example B01 and/or some other example(s) herein, further comprising: executing or operating a neural architecture search (NAS) algorithm to discover the replacement ML model.

Example B03 includes the method of examples B01-B02 and/or some other example(s) herein, further comprising: prior to deployment of the currently deployed ML model, optimizing a reference ML model for each of a plurality of different operational conditions of the HW platform, wherein one or more ML models of the set of ML models has fewer parameters than the reference ML model; and storing the set of ML models, wherein the currently deployed ML model and the replacement ML model are among the stored set of ML models.

Example B04 includes the method of example B03 and/or some other example(s) herein, wherein determining the replacement ML model comprising: discovering a set of candidate ML models among the stored set of ML models that satisfy a first system constraint of the HW platform and a second system constraint of the HW platform, wherein the first system constraint represents operational conditions of the HW platform when the currently deployed ML model was deployed, and the second system constraint represents operational conditions of the HW platform based on the detected operational changes; for each candidate ML model in the set of candidate ML models, determining a data transfer cost for replacing the currently deployed ML model with respective candidate ML models in the set of candidate ML models, the data transfer cost being an amount of computational resources needed to replace the currently deployed ML model with a corresponding one of the set of candidate ML models; and selecting, as the replacement ML model, a candidate ML model from the set of candidate ML models having a lowest data transfer cost.

Example B05 includes the method of example B04 and/or some other example(s) herein, wherein determining the data transfer cost for replacing the currently deployed ML model with respective candidate ML models comprises: vectorizing the respective candidate ML models; and comparing each of the vectorized candidate ML models with a vectorized version of the currently deployed ML model.

Example B06 includes the method of examples B01-B05 and/or some other example(s) herein, further comprising: obtaining an ML configuration including application quality metrics, system constraints, and performance auditor settings, wherein the application quality metrics include performance metric ranges for the currently deployed ML model, the system constraints include ranges of system parameters of the HW platform, and the performance auditor settings include combinations of the application quality metrics and the system constraints that indicate operational changes of the HW platform.

Example B07 includes the method of example B01 and/or some other example(s) herein, wherein the context information includes one or more of a current mode of operation of the HW platform, system state information of the HW platform, physical environment information about an environment surrounding the HW platform, and networking environment information about network conditions of the HW platform.

Example B08 includes the method of example B01 and/or some other example(s) herein, wherein the compute node is the HW platform or the compute node is a component of the HW platform.

Example B09 includes the method of example B01 and/or some other example(s) herein, wherein the HW platform is a different device than the compute node.

Example B10 includes the method of example B01 and/or some other example(s) herein, wherein the HW platform is an Internet of Things (IoT) device, a drone, a robot, an autonomous vehicle, a client device, a network appliance, a network element, an edge server, or one or more cloud compute nodes of a cloud computing service.

Example B11 includes the method of examples B01-AB10 and/or some other example(s) herein, wherein the HW platform is an edge compute node, and the method further comprises: distributing respective learning tasks of a federated ML model to a set of devices in a communications network, the set of devices including one or more client devices or one or more network access nodes; obtaining feedback from the set of devices, the feedback including completed ones of the respective learning tasks and at least a portion of the context information, wherein the portion of the context information includes one or more of an indication of an ability or inability of individual devices of the set of devices to complete the respective learning tasks, one or more signal quality measurements, and environmental condition data; and determining the replacement ML model to be an optimized version of the federated ML model based on the feedback.

Example Z01 includes one or more computer readable media comprising instructions, wherein execution of the instructions by processor circuitry is to cause the processor circuitry to perform the method of any one of examples A01-A18, B01-B11, and/or any other aspect discussed herein. Example Z02 includes a computer program comprising the instructions of example Z01. Example Z03 includes an Application Programming Interface defining functions, methods, variables, data structures, and/or protocols for the computer program of example Z02. Example Z04 includes an apparatus comprising circuitry loaded with the instructions of example Z01. Example Z05 includes an apparatus comprising circuitry operable to run the instructions of example Z01. Example Z06 includes an integrated circuit comprising one or more of the processor circuitry of example Z01 and the one or more computer readable media of example Z01. Example Z07 includes a computing system comprising the one or more computer readable media and the processor circuitry of example Z01. Example Z08 includes an apparatus comprising means for executing the instructions of example Z01. Example Z09 includes a signal generated as a result of executing the instructions of example Z01. Example Z10 includes a data unit generated as a result of executing the instructions of example Z01. Example Z11 includes the data unit of example Z10, the data unit is a datagram, network packet, data frame, data segment, a Protocol Data Unit (PDU), a Service Data Unit (SDU), a message, or a database object. Example Z12 includes a signal encoded with the data unit of example Z10 or Z11. Example Z13 includes an electromagnetic signal carrying the instructions of example Z01. Example Z14 includes an apparatus comprising means for performing the method of any one of examples A01-A18, B01-B11, and/or any other aspect discussed herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "accuracy" at least in some embodiments refers to the closeness of one or more measurements to a specific value. The term "precision" at least in some embodiments refers to the closeness of the two or more measurements to each other.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single dataset or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment (UE), end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M)

devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, Helmut-mounted display devices, augmented reality (AR) devices, virtual reality (VR) devices, mixed reality (MR) devices, and/or other like systems or devices.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", "subsystem". Additionally or alternatively, references to an "edge computing system" generally refer to a distributed architecture, organization, or collection of multiple nodes and devices, and which is organized to accomplish or offer some aspect of services or resources in an edge computing setting.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "reference" at least in some embodiments refers to data useable to locate other data and may be implemented a variety of ways (e.g., a pointer, an index, a handle, a key, an identifier, a hyperlink, etc.).

The term "artificial intelligence" or "AI" at least in some embodiments refers to any intelligence demonstrated by machines, in contrast to the natural intelligence displayed by humans and other animals. Additionally or alternatively, the term "artificial intelligence" or "AI" at least in some embodiments refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), etc.), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), etc.), Linear Dynamical System (LDS), Switching LDS (SLDS), Optical NNs (ONNs), an NN for reinforcement learning (RL) and/or deep RL (DRL), and/or the like.

The term "attention" in the context of machine learning and/or neural networks, at least in some embodiments refers to a technique that mimics cognitive attention, which enhances important parts of a dataset where the important parts of the dataset may be determined using training data by gradient descent. The term "dot-product attention" at least in some embodiments refers to an attention technique that uses the dot product between vectors to determine attention. The term "multi-head attention" at least in some embodiments refers to an attention technique that combines several different attention mechanisms to direct the overall attention of a network or subnetwork.

The term "attention model" or "attention mechanism" at least in some embodiments refers to input processing techniques for neural networks that allow the neural network to focus on specific aspects of a complex input, one at a time until the entire dataset is categorized. The goal is to break down complicated tasks into smaller areas of attention that are processed sequentially. Similar to how the human mind solves a new problem by dividing it into simpler tasks and solving them one by one. The term "attention network" at least in some embodiments refers to an artificial neural networks used for attention in machine learning.

The term "backpropagation" at least in some embodiments refers to a method used in NNs to calculate a gradient that is needed in the calculation of weights to be used in the NN; "backpropagation" is shorthand for "the backward propagation of errors." Additionally or alternatively, the term "backpropagation" at least in some embodiments refers to a method of calculating the gradient of neural network parameters. Additionally or alternatively, the term "backpropagation" or "back pass" at least in some embodiments refers to a method of traversing a neural network in reverse order, from the output to the input layer through any intermediary hidden layers.

The term "Bayesian optimization" at least in some embodiments refers to a sequential design strategy for global optimization of black-box functions that does not assume any functional forms.

The term "classification" in the context of ML at least in some embodiments refers to an ML technique for determining the classes to which various data points belong. Here, the term "class" or "classes" at least in some embodiments refers to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The term "computational graph" at least in some embodiments refers to a data structure that describes how an output is produced from one or more inputs.

The term "convolution" at least in some embodiments refers to a convolutional operation or a convolutional layer of a CNN.

The term "context" or "contextual information" at least in some embodiments refers to objects, entities, elements, events, data, information, etc., that surround a focal event and/or provides resources for an interpretation of the focal event. Additionally or alternatively, the term "context" or "contextual information" at least in some embodiments refers to any information about any entity that can be used to effectively reduce the amount of reasoning required (via filtering, aggregation, and inference) for decision making within the scope of a specific application. Additionally or alternatively, the term "context" or "contextual information" at least in some embodiments refers to a high-dimensional real-valued vector.

The term "convolutional filter" at least in some embodiments refers to a matrix having the same rank as an input matrix, but a smaller shape. In machine learning, a convolutional filter is mixed with an input matrix in order to train weights.

The term "convolutional layer" at least in some embodiments refers to a layer of a DNN in which a convolutional filter passes along an input matrix (e.g., a CNN). Additionally or alternatively, the term "convolutional layer" at least in some embodiments refers to a layer that includes a series of convolutional operations, each acting on a different slice of an input matrix.

The term "convolutional neural network" or "CNN" at least in some embodiments refers to a neural network including at least one convolutional layer. Additionally or alternatively, the term "convolutional neural network" or "CNN" at least in some embodiments refers to a DNN designed to process structured arrays of data such as images.

The term "convolutional operation" at least in some embodiments refers to a mathematical operation on two functions (e.g., $f$ and g) that produces a third function ($f*g$) that expresses how the shape of one is modified by the other where the term "convolution" may refer to both the result function and to the process of computing it. Additionally or alternatively, term "convolutional" at least in some embodiments refers to the integral of the product of the two functions after one is reversed and shifted, where the integral is evaluated for all values of shift, producing the convolution function. Additionally or alternatively, term "convolutional" at least in some embodiments refers to a two-step mathematical operation element-wise multiplication of the convolutional filter and a slice of an input matrix (the slice of the input matrix has the same rank and size as the convolutional filter); and (2) summation of all the values in the resulting product matrix.

The term "covariance" at least in some embodiments refers to a measure of the joint variability of two random variables, wherein the covariance is positive if the greater values of one variable mainly correspond with the greater values of the other variable (and the same holds for the lesser values such that the variables tend to show similar behavior), and the covariance is negative when the greater values of one variable mainly correspond to the lesser values of the other.

The term "ensemble averaging" at least in some embodiments refers to the process of creating multiple models and combining them to produce a desired output, as opposed to creating just one model.

The term "ensemble learning" or "ensemble method" at least in some embodiments refers to using multiple learning algorithms to obtain better predictive performance than could be obtained from any of the constituent learning algorithms alone.

The term "event", in probability theory, at least in some embodiments refers to a set of outcomes of an experiment (e.g., a subset of a sample space) to which a probability is assigned. Additionally or alternatively, the term "event" at least in some embodiments refers to a software message indicating that something has happened. Additionally or alternatively, the term "event" at least in some embodiments refers to an object in time, or an instantiation of a property in an object. Additionally or alternatively, the term "event" at least in some embodiments refers to a point in space at an instant in time (e.g., a location in space-time). Additionally or alternatively, the term "event" at least in some embodiments refers to a notable occurrence at a particular point in time.

The term "experiment" in probability theory, at least in some embodiments refers to any procedure that can be repeated and has a well-defined set of outcomes, known as a sample space.

The term "feature" at least in some embodiments refers to an individual measureable property, quantifiable property, or characteristic of a phenomenon being observed. Additionally or alternatively, the term "feature" at least in some embodiments refers to an input variable used in making predictions. At least in some embodiments, features may be represented using numbers/numerals (e.g., integers), strings, variables, ordinals, real-values, categories, and/or the like.

The term "feature engineering" at least in some embodiments refers to a process of determining which features might be useful in training an ML model, and then converting raw data into the determined features. Feature engineering is sometimes referred to as "feature extraction."

The term "feature extraction" at least in some embodiments refers to a process of dimensionality reduction by which an initial set of raw data is reduced to more manageable groups for processing. Additionally or alternatively, the term "feature extraction" at least in some embodiments refers to retrieving intermediate feature representations calculated by an unsupervised model or a pre-trained model for use in another model as an input. Feature extraction is sometimes used as a synonym of "feature engineering."

The term "feature map" at least in some embodiments refers to a function that takes feature vectors (or feature tensors) in one space and transforms them into feature vectors (or feature tensors) in another space. Additionally or alternatively, the term "feature map" at least in some embodiments refers to a function that maps a data vector (or tensor) to feature space. Additionally or alternatively, the term "feature map" at least in some embodiments refers to a function that applies the output of one filter applied to a previous layer. In some embodiments, the term "feature map" may also be referred to as an "activation map".

The term "feature vector" at least in some embodiments, in the context of ML, refers to a set of features and/or a list of feature values representing an example passed into a model.

The term "forward propagation" or "forward pass" at least in some embodiments, in the context of ML, refers to the calculation and storage of intermediate variables (including outputs) for a neural network in order from the input layer to the output layer through any hidden layers between the input and output layers.

The term "hidden layer", in the context of ML and NNs, at least in some embodiments refers to an internal layer of neurons in an ANN that is not dedicated to input or output. The term "hidden unit" refers to a neuron in a hidden layer in an ANN.

The term "hyperparameter" at least in some embodiments refers to characteristics, properties, and/or parameters for an ML process that cannot be learnt during a training process. Hyperparameter are usually set before training takes place, and may be used in processes to help estimate model parameters. Examples of hyperparameters include model size (e.g., in terms of memory space, bytes, number of layers, etc.); training data shuffling (e.g., whether to do so and by how much); number of evaluation instances, iterations, epochs (e.g., a number of iterations or passes over the training data), or episodes; number of passes over training data; regularization; learning rate (e.g., the speed at which the algorithm reaches (converges to) optimal weights); learning rate decay (or weight decay); momentum; number of hidden layers; size of individual hidden layers; weight initialization scheme; dropout and gradient clipping thresholds; the C value and sigma value for SVMs; the k in k-nearest neighbors; number of branches in a decision tree; number of clusters in a clustering algorithm; vector size; word vector size for NLP and NLU; and/or the like.

The term "inference engine" at least in some embodiments refers to a component of a computing system that applies logical rules to a knowledge base to deduce new information.

The terms "instance-based learning" or "memory-based learning" in the context of ML at least in some embodiments refers to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), etc.), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "intelligent agent" at least in some embodiments refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The term "iteration" at least in some embodiments refers to the repetition of a process in order to generate a sequence of outcomes, wherein each repetition of the process is a single iteration, and the outcome of each iteration is the starting point of the next iteration. Additionally or alternatively, the term "iteration" at least in some embodiments refers to a single update of a model's weights during training.

The term "knowledge base" at least in some embodiments refers to any technology used to store complex structured and/or unstructured information used by a computing system.

The term "knowledge distillation" in machine learning, at least in some embodiments refers to the process of transferring knowledge from a large model to a smaller one.

The term "loss function" or "cost function" at least in some embodiments refers to an event or values of one or more variables onto a real number that represents some "cost" associated with the event. A value calculated by a loss function may be referred to as a "loss" or "error". Additionally or alternatively, the term "loss function" or "cost function" at least in some embodiments refers to a function used to determine the error or loss between the output of an algorithm and a target value. Additionally or alternatively, the term "loss function" or "cost function" at least in some embodiments refers to a function are used in optimization problems with the goal of minimizing a loss or error.

The term "machine learning" or "ML" at least in some embodiments refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some embodiments refers to different concepts than the term "ML model," these terms may be used interchangeably for the purposes of the present disclosure. Furthermore, the term "AI/ML application" or the like at least in some embodiments refers to an application that contains some AI/ML models and application-level descriptions. ML techniques generally fall into the following main types of learning problem categories: supervised learning, unsupervised learning, and reinforcement learning.

The term "mathematical model" at least in some embodiments refer to a system of postulates, data, and inferences presented as a mathematical description of an entity or state of affairs including governing equations, assumptions, and constraints.

The terms "model parameter" and/or "parameter" in the context of ML, at least in some embodiments refer to values, characteristics, and/or properties that are learnt during training. Additionally or alternatively, "model parameter" and/or "parameter" in the context of ML, at least in some embodiments refer to a configuration variable that is internal to the model and whose value can be estimated from the given data. Model parameters are usually required by a model when making predictions, and their values define the skill of the model on a particular problem. Examples of such model parameters/parameters include weights (e.g., in an ANN); constraints; support vectors in a support vector machine (SVM); coefficients in a linear regression and/or logistic regression; word frequency, sentence length, noun or verb distribution per sentence, the number of specific character n-grams per word, lexical diversity, etc., for natural language processing (NLP) and/or natural language understanding (NLU); and/or the like.

The term "momentum" at least in some embodiments refers to an aggregate of gradients in gradient descent. Additionally or alternatively, the term "momentum" at least in some embodiments refers to a variant of the stochastic gradient descent algorithm where a current gradient is replaced with m (momentum), which is an aggregate of gradients.

The term "objective function" at least in some embodiments refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" at least in some embodiments refers to a variable that represents a decision to be made. The term "objective" in the context of optimization at least in some embodiments refers to a function that may depend on one or more decision variables.

The term "optimization" at least in some embodiments refers to an act, process, or methodology of making something (e.g., a design, system, or decision) as fully perfect, functional, or effective as possible. Optimization usually includes mathematical procedures such as finding the maximum or minimum of a function. The term "optimal" at least in some embodiments refers to a most desirable or satisfactory end, outcome, or output. The term "optimum" at least in some embodiments refers to an amount or degree of something that is most favorable to some end. The term "optima" at least in some embodiments refers to a condition, degree, amount, or compromise that produces a best possible result. Additionally or alternatively, the term "optima" at least in some embodiments refers to a most favorable or advantageous outcome or result.

The term "probability" at least in some embodiments refers to a numerical description of how likely an event is to occur and/or how likely it is that a proposition is true. The term "probability distribution" at least in some embodiments refers to a mathematical function that gives the probabilities of occurrence of different possible outcomes for an experiment or event.

The term "quantile" at least in some embodiments refers to a cut point(s) dividing a range of a probability distribution into continuous intervals with equal probabilities, or dividing the observations in a sample in the same way. The term "quantile function" at least in some embodiments refers to a function that is associated with a probability distribution of a random variable, and the specifies the value of the random variable such that the probability of the variable being less than or equal to that value equals the given probability. The term "quantile function" may also be referred to as a percentile function, percent-point function, or inverse cumulative distribution function.

The terms "regression algorithm" and/or "regression analysis" in the context of ML at least in some embodiments refers to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The term "reinforcement learning" or "RL" at least in some embodiments refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep RL.

The term "sample space" in probability theory (also referred to as a "sample description space" or "possibility space") of an experiment or random trial at least in some embodiments refers to a set of all possible outcomes or results of that experiment.

The term "self-attention" at least in some embodiments refers to an attention mechanism relating different positions of a single sequence in order to compute a representation of the sequence. Additionally or alternatively, the term "self-attention" at least in some embodiments refers to an attention mechanism applied to a single context instead of across multiple contexts wherein queries, keys, and values are extracted from the same context.

The term "softmax" or "softmax function" at least in some embodiments refers to a generalization of the logistic function to multiple dimensions; the "softmax function" is used in multinomial logistic regression and is often used as the last activation function of a neural network to normalize the output of a network to a probability distribution over predicted output classes.

The term "supervised learning" at least in some embodiments refers to an ML technique that aims to learn a function or generate an ML model that produces an output given a labeled dataset. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "tensor" at least in some embodiments refers to an object or other data structure represented by an array of components that describe functions relevant to coordinates of a space. Additionally or alternatively, the term "tensor" at least in some embodiments refers to a generalization of vectors and matrices and/or may be understood to be a multidimensional array. Additionally or alternatively, the term "tensor" at least in some embodiments refers to an array of numbers arranged on a regular grid with a variable number of axes. At least in some embodiments, a tensor can be defined as a single point, a collection of isolated points, or a continuum of points in which elements of the tensor are functions of position, and the Tensor forms a "tensor field". At least in some embodiments, a vector may be considered as a one dimensional (1D) or first order tensor, and a matrix may be considered as a two dimensional (2D) or second order tensor. Tensor notation may be the same or similar as matrix notation with a capital letter representing the tensor and lowercase letters with subscript integers representing scalar values within the tensor.

The term "unsupervised learning" at least in some embodiments refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning at least in some embodiments refers to ML algorithms that develop ML models from incomplete training data, where a portion of the sample input does not include labels.

The term "vector" at least in some embodiments refers to a tuple of one or more values called scalars, and a "feature vector" may be a vector that includes a tuple of one or more features.

The term "benchmark" or "benchmarking" at least in some embodiments refers to a measure of performance using a specific indicator resulting in a metric of performance. Additionally or alternatively, the term "benchmark" or "benchmarking" at least in some embodiments refers to the act of running a computer program, a set of programs, or other operations, in order to assess the relative performance of an object, normally by running a number of standard tests and trials against it.

The term "translation" at least in some embodiments refers to the process of converting or otherwise changing data from a first form, shape, configuration, structure, arrangement, embodiment, description, etc. into a second form, shape, configuration, structure, arrangement, embodiment, description, etc.; at least in some embodiments there may be two different types of translation: transcoding and transformation.

The term "transcoding" at least in some embodiments refers to taking information/data in one format (e.g., a packed binary format) and translating the same information/data into another format in the same sequence. Additionally or alternatively, the term "transcoding" at least in some embodiments refers to taking the same information, in the same sequence, and packaging that information (e.g., bits or bytes) differently. The term "transformation" at least in some embodiments refers to changing data from one format and writing it in another format, keeping the same order, sequence, and/or nesting of data items. Additionally or alternatively, the term "transformation" at least in some embodiments involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some embodiments refers to changing the schema of a data object to another schema.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/ throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus comprising:
    interface circuitry to obtain context information of a hardware (HW) platform on which a first machine learning (ML) model is to be deployed;
    instructions; and
    at least one processor to be programmed based on the instructions to:
        deploy the first ML model, the first ML model from a plurality of ML models generated based on a reference ML model, respective ML models in the plurality of ML models associated with different operational conditions of the HW platform;
        detect a status change of the HW platform based on at least one of the context information of the HW platform or inference results generated by the deployed first ML model;
        trigger a swap of the deployed first ML model with a replacement second ML model, the second ML model included in the plurality of ML models, the second ML model generated to run on the HW platform under one or more constraints with at least one improved performance metric relative to performance of the first ML model on the HW platform under the one or more constraints; and
        provision the replacement second ML model to the HW platform.

2. The apparatus of claim 1, wherein the processor is further to operate a machine learning model swap (MLMS) engine.

3. The apparatus of claim 2, wherein the processor is further to operate the MLMS engine to execute a neural architecture search (NAS) algorithm to discover the replacement ML model.

4. The apparatus of claim 2, wherein one or more ML models of the plurality of ML models has fewer parameters than the reference ML model.

5. The apparatus of claim 4, wherein, to perform the MLMS, the processor is further to operate the MLMS engine to:
    discover a set of candidate ML models among the plurality of ML models that satisfy a first system constraint of the HW platform and a second system constraint of the HW platform, wherein:
        the first system constraint represents a system context of the HW platform when the currently deployed ML model was deployed, and
        the second system constraint represents a system context of the HW platform based on the detected status change;
    for each candidate ML model in the set of candidate ML models, determine a data transfer cost, the data transfer cost being an amount of computational resources needed to replace the currently deployed ML model with a corresponding one of the set of candidate ML models; and
    select, as the replacement ML model, a candidate ML model from the set of candidate ML models having a lowest data transfer cost.

6. The apparatus of claim 1, wherein the interface circuitry is further to obtain an ML configuration, wherein the ML configuration includes thresholds for triggering performance of machine learning model swap (MLMS).

7. The apparatus of claim 6, wherein the thresholds for triggering performance of the MLMS include application quality metrics, wherein the application quality metrics include performance metric thresholds for the currently deployed ML model that, when reached or exceeded, trigger the performance of the MLMS.

8. The apparatus of claim 6, wherein the thresholds for triggering performance of the MLMS include system constraints, wherein the system constraints include thresholds for one or more system parameters of the HW platform that, when reached or exceeded, trigger the performance of the MLMS.

9. The apparatus of claim 1, wherein the context information includes a current mode of operation of the HW platform, and the current mode of operation of the HW platform includes one of a sleep mode, an idle mode, an awake mode, and a burst.

10. The apparatus of claim 1, wherein the context information includes system state information (SSI) of the HW platform, and the SSI includes one or more of temperature of individual HW components of the HW platform, computational capacity, memory utilization, power source state information, operating system information, and a semiconductor process of the individual HW components.

11. The apparatus of claim 1, wherein the context information includes physical environment information (PEI) about an environment surrounding the HW platform, and the PEI includes one or more of a current temperature, humidity, moisture, altitude, ambient light, ambient sound volume, and weather data for a location of the HW platform.

12. The apparatus of claim 1, wherein the context information includes networking environment information (NEI) of the HW platform, and the NEI includes one or more of channel state conditions, network connectivity metrics, data transfer rates, and network parameters.

13. The apparatus of claim 1, wherein the apparatus is the HW platform or the apparatus is a component of the HW platform.

14. The apparatus of claim 1, wherein the apparatus is separate from the HW platform.

15. The apparatus of claim 1, wherein the HW platform is one of an Internet of Things (IoT) device, a drone, an autonomous vehicle, a client device, a network appliance, a network element, an edge server, or one or more cloud compute nodes of a cloud computing service.

16. The apparatus of claim 1, wherein the HW platform is an edge compute node and the processor is further to:
operate a federated ML model to:
distribute respective learning tasks to a plurality of devices in a communications network, the plurality of devices including one or more client devices or one or more network access nodes, and
obtain feedback from the plurality of devices, the feedback including completed ones of the respective learning tasks and at least a portion of the context information, wherein the portion of the context information includes one or more of an indication of an ability or inability of individual devices of the plurality of devices to complete the respective learning tasks, one or more signal quality measurements, and environmental condition data; and
determine the replacement ML model to be an optimized version of the federated ML model based on the feedback.

17. One or more non-transitory computer readable media (NTCRM) comprising instructions for a machine learning model swap (MLMS) strategy, wherein execution of the instructions by one or more processors of a compute node is to cause the compute node to:
obtain context information of a hardware (HW) platform on which a first machine learning (ML) model is to be deployed;
deploy the first ML model, the first ML model from a plurality of ML models generated based on a reference ML model, respective ML models in the plurality of ML models associated with different operational conditions of the HW platform;
obtain inference results generated by the deployed first ML model;
detect operational changes of the HW platform based on at least one of the context information or the inference results;
determine a second ML model to replace the first ML model, wherein the second ML model is included in the plurality of ML models the second ML model generated to run on the HW platform under the detected operational changes with at least one improved performance metric relative to performance of the first ML model on the HW platform under the detected operational changes; and
provision the second ML model to the HW platform.

18. The one or more NTCRM of claim 17, wherein execution of the instructions is to cause the compute node to:
execute a neural architecture search (NAS) algorithm to discover the replacement ML model.

19. The one or more NTCRM of claim 17, wherein one or more ML models of the plurality of ML models has fewer parameters than the reference ML model.

20. The one or more NTCRM of claim 19, wherein, to determine the replacement ML model, execution of the instructions is to cause the compute node to:
discover a set of candidate ML models among the plurality of ML models that satisfy a first system constraint of the HW platform and a second system constraint of the HW platform, wherein:
the first system constraint represents operational conditions of the HW platform when the currently deployed ML model was deployed, and
the second system constraint represents operational conditions of the HW platform based on the detected operational changes;
for each candidate ML model in the set of candidate ML models, determine a data transfer cost for replacing the currently deployed ML model with respective candidate ML models in the set of candidate ML models, the data transfer cost being an amount of computational resources needed to replace the currently deployed ML model with a corresponding one of the set of candidate ML models; and
select, as the replacement ML model, a candidate ML model from the set of candidate ML models having a lowest data transfer cost.

21. The one or more NTCRM of claim 20, wherein, to determine the data transfer cost for replacing the currently deployed ML model with respective candidate ML models, execution of the instructions is to cause the compute node to:
vectorize the respective candidate ML models; and
compare each of the vectorized candidate ML models with a vectorized version of the currently deployed ML model.

22. The one or more NTCRM of claim 17, wherein execution of the instructions is to cause the compute node to:
obtain an ML configuration including application quality metrics, system constraints, and performance auditor settings, wherein:
the application quality metrics include performance metric ranges for the currently deployed ML model,
the system constraints include ranges of system parameters of the HW platform, and
the performance auditor settings include combinations of the application quality metrics and the system constraints that indicate operational changes of the HW platform.

23. The one or more NTCRM of claim 17, wherein the context information includes one or more of a current mode of operation of the HW platform, system state information of the HW platform, physical environment information about an environment surrounding the HW platform, and networking environment information about network conditions of the HW platform.

24. The one or more NTCRM of claim 17, wherein the compute node is the HW platform or the compute node is a component of the HW platform.

25. The one or more NTCRM of claim 17, wherein the HW platform is a different device than the compute node.

26. The one or more NTCRM of claim 17, wherein the HW platform is an Internet of Things (IoT) device, a drone, a robot, an autonomous vehicle, a client device, a network appliance, a network element, an edge server, or one or more cloud compute nodes of a cloud computing service.

27. The one or more NTCRM of claim 17, wherein the HW platform is an edge compute node, and execution of the instructions is to cause the compute node to:
distribute respective learning tasks of a federated ML model to a plurality of devices in a communications network, the plurality of devices including one or more client devices or one or more network access nodes;
obtain feedback from the plurality of devices, the feedback including completed ones of the respective learning tasks and at least a portion of the context information, wherein the portion of the context information includes one or more of an indication of an ability or inability of individual devices of the plurality of devices to complete the respective learning tasks, one or more signal quality measurements, and environmental condition data; and determine the replacement ML model to be an optimized version of the federated ML model based on the feedback.

* * * * *